US010680771B2

(12) United States Patent
Yoo et al.

(10) Patent No.: US 10,680,771 B2
(45) Date of Patent: Jun. 9, 2020

(54) REFERENCE SIGNAL TRANSMISSION AND AVERAGING FOR WIRELESS COMMUNICATIONS

(71) Applicant: QUALCOMM Incorporated, San Diego, CA (US)

(72) Inventors: Taesang Yoo, Riverside, CA (US); Xiliang Luo, San Diego, CA (US); Peter Gaal, San Diego, CA (US); Tao Luo, San Diego, CA (US); Durga Prasad Malladi, San Diego, CA (US); Yongbin Wei, La Jolla, CA (US); Wanshi Chen, San Diego, CA (US); Hao Xu, San Diego, CA (US); Aleksandar Damnjanovic, Del Mar, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 348 days.

(21) Appl. No.: 14/797,644

(22) Filed: Jul. 13, 2015

(65) Prior Publication Data

US 2016/0065341 A1    Mar. 3, 2016

Related U.S. Application Data

(60) Provisional application No. 62/043,219, filed on Aug. 28, 2014.

(51) Int. Cl.
*H04L 5/00* (2006.01)
*H04L 25/02* (2006.01)
(Continued)

(52) U.S. Cl.
CPC ........ *H04L 5/0048* (2013.01); *H04L 25/0224* (2013.01); *H04W 72/0446* (2013.01); *H04W 72/1273* (2013.01); *H04W 88/08* (2013.01)

(58) Field of Classification Search
CPC ............. H04L 5/0048; H04L 25/0224; H04W 72/1273; H04W 72/0446; H04W 88/08
See application file for complete search history.

(56) References Cited

U.S. PATENT DOCUMENTS 8,243,696 B2    8/2012 Onggosanusi et al.
8,761,784 B2    6/2014 Malladi et al.
(Continued)

FOREIGN PATENT DOCUMENTS

| CN | 1020457280 A | 5/2011 |
| WO | WO-2014113789 A1 | 7/2014 |
| WO | WO-2014119919 A1 | 8/2014 |

OTHER PUBLICATIONS

WO-2014119919-A1, Yi, Yun Jung, et al., Aug. 7, (Year: 2014).*
(Continued)

*Primary Examiner* — Walter J Divito
*Assistant Examiner* — Anthony Luo
(74) *Attorney, Agent, or Firm* — Holland & Hart LLP

(57) ABSTRACT

Techniques are provided for combining different types of reference signals. A wireless communications network may be configured to allow a user equipment (UE) to combine multiple demodulation reference signals (DM-RSs) to support demodulation of a physical downlink shared channel (PDSCH), and/or other downlink transmissions, transmitted from a base station to the UE. The base station may provide explicit signaling that reference signals transmitted in two or more transmission time intervals may be combined, or a determination that reference signals transmitted in two or more transmission time intervals may be combined may be made implicitly based on system configuration and previous
(Continued)

transmissions. Based on the explicit signaling and/or implicit determination, a UE may combine reference signals included in each of two or more reference signals for use in demodulation of downlink transmissions.

28 Claims, 17 Drawing Sheets

(51) Int. Cl.
*H04W 72/04* (2009.01)
*H04W 72/12* (2009.01)
*H04W 88/08* (2009.01)

(56) References Cited

U.S. PATENT DOCUMENTS

| | | | |
|---|---|---|---|
| 8,817,686 B2 | 8/2014 | Cai et al. | |
| 9,008,035 B2 | 4/2015 | Qu et al. | |
| 9,014,127 B2 | 4/2015 | Chung et al. | |
| 9,755,810 B2 | 9/2017 | Gaal et al. | |
| 2008/0077837 A1* | 3/2008 | Lohr | H04L 1/0006 714/748 |
| 2009/0185547 A1* | 7/2009 | Budampati | H04L 45/306 370/345 |
| 2009/0296798 A1* | 12/2009 | Banna | H04B 1/70754 375/229 |
| 2010/0203826 A1* | 8/2010 | Xue | H04B 7/15521 455/9 |
| 2010/0232384 A1 | 9/2010 | Farajidana et al. | |
| 2012/0320841 A1* | 12/2012 | Miki | H04B 7/0689 370/329 |
| 2013/0028180 A1* | 1/2013 | Gao | H04W 74/004 370/328 |
| 2013/0039203 A1* | 2/2013 | Fong | H04B 7/024 370/252 |
| 2013/0176876 A1* | 7/2013 | Wakayama | H04W 72/048 370/252 |
| 2013/0242886 A1* | 9/2013 | Chen | H04W 28/0268 370/329 |
| 2015/0009925 A1* | 1/2015 | Park | H04L 5/005 370/329 |

OTHER PUBLICATIONS

HTC, "UE-Specific RS Reduction for Improved Spectral Efficiency," R1-131207, 3GPP TSG RAN WG1 Meeting #72bis, Chicago, USA, Apr. 15-19, 2013, 3 pgs., 3rd Generation Partnership Project.

ISA/EPO, International Search Report and Written Opinion of the International Searching Authority, Int'l Appl. No. PCT/US2015/040253, dated Sep. 28, 2015, European Patent Office, Rijswijk, NL, 12 pgs.

* cited by examiner

REFERENCE SIGNAL TRANSMISSION AND AVERAGING FOR WIRELESS COMMUNICATIONS

CROSS REFERENCES

The present application for patent claims priority to U.S. Provisional Patent Application No. 62/043,219 by Yoo et al., entitled "Reference Signal Transmission and Averaging for Wireless Communications," filed Aug. 28, 2014, assigned to the assignee hereof, and expressly incorporated by reference herein.

BACKGROUND

The following relates generally to wireless communication, and more specifically to techniques for reference signal transmission and averaging for different services in wireless communications systems.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

These multiple access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

As technology advances, some more advanced mobile devices within a wireless communications network may have capabilities for communications transmitted according to different timing characteristics relative to legacy mobile devices that operate within the network. In some instances, reference signals may be transmitted between a base station and a UE, in order to assist with estimating channel conditions and reliably receiving and decoding transmissions. According to traditional deployments, certain types of reference signals, such as demodulation reference signals (DM-RS), may not be combinable due to potential different precoding that may be applied to different instances of a DM-RS. In certain situations, it may be desirable to provide flexibility in combining different types of reference signals of a wireless communications network based on different mobile devices that operate according to different timing characteristics.

SUMMARY

The described features generally relate to one or more improved systems, methods, and/or devices for combining different types of reference signals. In some examples, a wireless communications network may be configured to allow a user equipment (UE) to combine multiple demodulation reference signals (DM-RSs) to support demodulation of a physical downlink shared channel (PDSCH), and/or other downlink transmissions, transmitted from a base station to the UE. In some examples, the base station may provide explicit signaling that reference signals transmitted in two or more transmission time intervals may be combined. In certain examples, the determination that reference signals transmitted in two or more transmission time intervals are combinable may be made implicitly based on system configuration and previous transmissions. Based on the explicit signaling or implicit determination, a UE may combine reference signals included in each of the two or more reference signals for use in demodulation of downlink transmissions.

In a first set of illustrative examples, a method for wireless communication is described. In a configuration, the method may include receiving an indication that reference signals transmitted in two or more transmission time intervals may be combined, where the reference signals may be transmitted using resources associated with a group identification or a UE identification. In such a configuration, the method may include receiving transmissions during the two or more transmission time intervals. Further, in such a configuration, the method may include combining the reference signals included in the transmissions during the two or more transmission time intervals based at least in part on the indication.

According to the first set of examples, an apparatus for wireless communication is described. In one configuration, the apparatus may include means for receiving an indication that reference signals transmitted in two or more transmission time intervals may be combined, where the reference signals may be transmitted using resources associated with a group identification or a UE identification. In such a configuration, the apparatus may include means for receiving transmissions during the two or more transmission time intervals. Further, in such a configuration, the apparatus may include means for combining reference signals included in the transmissions during the two or more transmission time intervals based at least in part on the indication.

According to the first set of examples, another apparatus for wireless communication is described. In one configuration, the apparatus may include a processor, memory in electronic communication with the processor, and instructions stored in the memory. The instructions may be executable by the processor to receive an indication that reference signals transmitted in two or more transmission time intervals may be combined, where the reference signals may be transmitted using resources associated with a group identification or a UE identification. Further, the instructions may be executable by the processor to receive transmissions during the two or more transmission time intervals. Moreover, the instructions may be executable by the processor to combine reference signals included in the transmissions during the two or more transmission time intervals based at least in part on the indication.

According to the first set of examples, a non-transitory computer-readable medium storing computer-executable code for wireless communication is described. In one configuration, the code may be executable by a processor to receive an indication that reference signals transmitted in two or more transmission time intervals may be combined, where the reference signals may be transmitted using resources associated with a group identification or a UE identification. Further, the code may be executable by a processor to receive transmissions during the two or more transmission time intervals. Moreover, the code may be executable by a processor to combine reference signals included in the transmissions during the two or more transmission time intervals based at least in part on the indication.

In some aspects of the method, apparatuses, and/or non-transitory computer-readable medium of the first set of examples, the indication is received through explicit signaling, where the reference signals may be transmitted using resources associated with a group identification or a UE identification. The indication, in some examples, may be received in one or more control signals. In certain examples, the indication may be received in a downlink grant for one or more transmission time intervals, and the determination that the reference signals from two or more transmission time intervals can be combined may be based at least in part on the downlink grant. In some examples, the two or more transmission time intervals are consecutive transmission time intervals and/or are within a predetermined number of non-consecutive transmission time intervals.

In some aspects of the method, apparatuses, and/or non-transitory computer-readable medium of the first set of examples, the indication is received through a scheduling grant. In some cases, the indication is received through a control channel format used to transmit the scheduling grant. In other examples, the combination of the reference signals may be determined based at least in part on determining that the scheduling grant and at least one other transmission are transmitted within a set number of consecutive transmission time intervals.

In certain examples, the indication that reference signals may be combined may be based on a group identification. The group identification may be associated, for example, with a reference signal scrambling sequence, and a determination may be made of a presence of a reference signal according to the scrambling sequence. In some examples, reference signals are combined when the group identification associated with the reference signals are the same in the two or more transmission time intervals.

In some aspects of the method, apparatuses, and/or non-transitory computer-readable medium of the first set of examples, combining reference signals may include combining reference signals from a first transmission time interval and a second transmission time interval of the two or more transmission time intervals during the second time interval, and combining reference signals from the first transmission time interval, the second transmission time interval, and a third transmission time interval of the two or more transmission time intervals during the third transmission time interval. In some examples, the two or more transmission time intervals each comprise a transmission time interval of a first type having a duration that is less than a duration of a transmission time interval of a second type. In some examples, physical downlink shared channel (PDSCH) transmissions may use an initial low rank until reference signals are combined over at least the first transmission time interval and the second transmission time interval, and PDSCH transmissions may use a higher rank following the second transmission time interval.

In a second set of illustrative examples, a method for wireless communication is described. In one configuration, the method may include determining that at least one user equipment (UE) is configured to combine reference signals transmitted in two or more transmission time intervals, where the reference signals may be transmitted using resources associated with a group identification or a UE identification. In such a configuration, the method may include transmitting an indication that reference signals transmitted in two or more transmission time intervals may be combined. Further, in such a configuration, the method may include transmitting the reference signals during the two or more transmission time intervals.

According to the second set of examples, an apparatus for wireless communication is described. In one configuration, the apparatus may include means for determining that at least one user equipment (UE) is configured to combine reference signals transmitted in two or more transmission time intervals, where the reference signals may be transmitted using resources associated with a group identification or a UE identification. In such a configuration, the apparatus may include means for transmitting an indication that reference signals transmitted in two or more transmission time intervals may be combined. Further, the apparatus may include means for transmitting the reference signals during the two or more transmission time intervals.

According to the second set of examples, an apparatus for wireless communication is described. In one configuration, the apparatus may include a processor, memory in electronic communication with the processor, and instructions stored in the memory. The instructions may be executable by the processor to determine that at least one user equipment (UE) is configured to combine reference signals transmitted in two or more transmission time intervals, where the reference signals may be transmitted using resources associated with a group identification or a UE identification. Further, the instructions may be executable by the processor to transmit an indication that reference signals transmitted in two or more transmission time intervals may be combined. Moreover, the instructions may be executable by the processor to transmit the reference signals during the two or more transmission time intervals.

According to the second set of examples, a non-transitory computer-readable medium storing computer-executable code for wireless communication is described. In one configuration, the code may be executable by a processor to determine that at least one user equipment (UE) is configured to combine reference signals transmitted in two or more transmission time intervals, where the reference signals may be transmitted using resources associated with a group identification or a UE identification. Further, the code may be executable by the processor to transmit an indication that reference signals transmitted in two or more transmission time intervals may be combined. Moreover, the code may be executable by the processor to transmit the reference signals during the two or more transmission time intervals.

In some aspects of the method, apparatuses, and/or non-transitory computer-readable medium of the second set of examples, transmission of the indication may include transmitting signaling indicating that the reference signals in the two or more transmission time intervals are combinable. In certain examples, transmission of the indication may include transmitting a downlink grant for one or more transmission time intervals, the downlink grant indicating that the reference signals from two or more transmission time intervals can be combined based at least in part on the downlink grant, where the reference signals may be transmitted using resources associated with a group identification or a UE identification. In other examples, the transmission of the indication may include transmitting one or more control channel transmissions, and wherein the indication that reference signals may be combined is inferred from a control channel format used to transmit the control channel transmissions.

In some aspects of the method, apparatuses, and/or non-transitory computer-readable medium of the second set of examples, the indication that reference signals may be combined may be inferred from a group identification transmitted to the UE. The group identification may be associated, for example, with a reference signal scrambling sequence. In still further aspects the transmission of the reference signals may include transmitting a first reference signal during a first physical downlink shared channel (PDSCH) transmissions during a first transmission time interval using a first rank, and transmitting a second reference signal during a subsequent PDSCH transmission using a rank higher than the first rank.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques are described for combining different types of reference signals. In some examples, a wireless communications network may be configured to allow a user equipment (UE) to combine multiple demodulation reference signals (DM-RSs) to support demodulation of a physical downlink shared channel (PDSCH), and/or other downlink transmissions, transmitted from a base station to the UE. A DM-RS may also be referred to as a UE-specific reference signal (UE-RS). Reference signals from both control channel (e.g., physical downlink control channel (PDCCH)) reference signals and shared channel (e.g., PDSCH) reference signals may be combined, according to some examples. Determination that two or more reference signals transmitted during two or more transmission time intervals (TTIs) may be combined may be made through explicit signaling that reference signals transmitted in the two or more TTIs may be combined, according to various examples. In certain examples, a UE may use implicit characteristics of various transmissions to determine that reference signals may be combined, such as system configuration and a number of TTIs since a previous reference signal was transmitted. Based on the explicit signaling or implicit determination, a UE may combine reference signals included in each of the two or more reference signals for use in demodulation of downlink transmissions.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
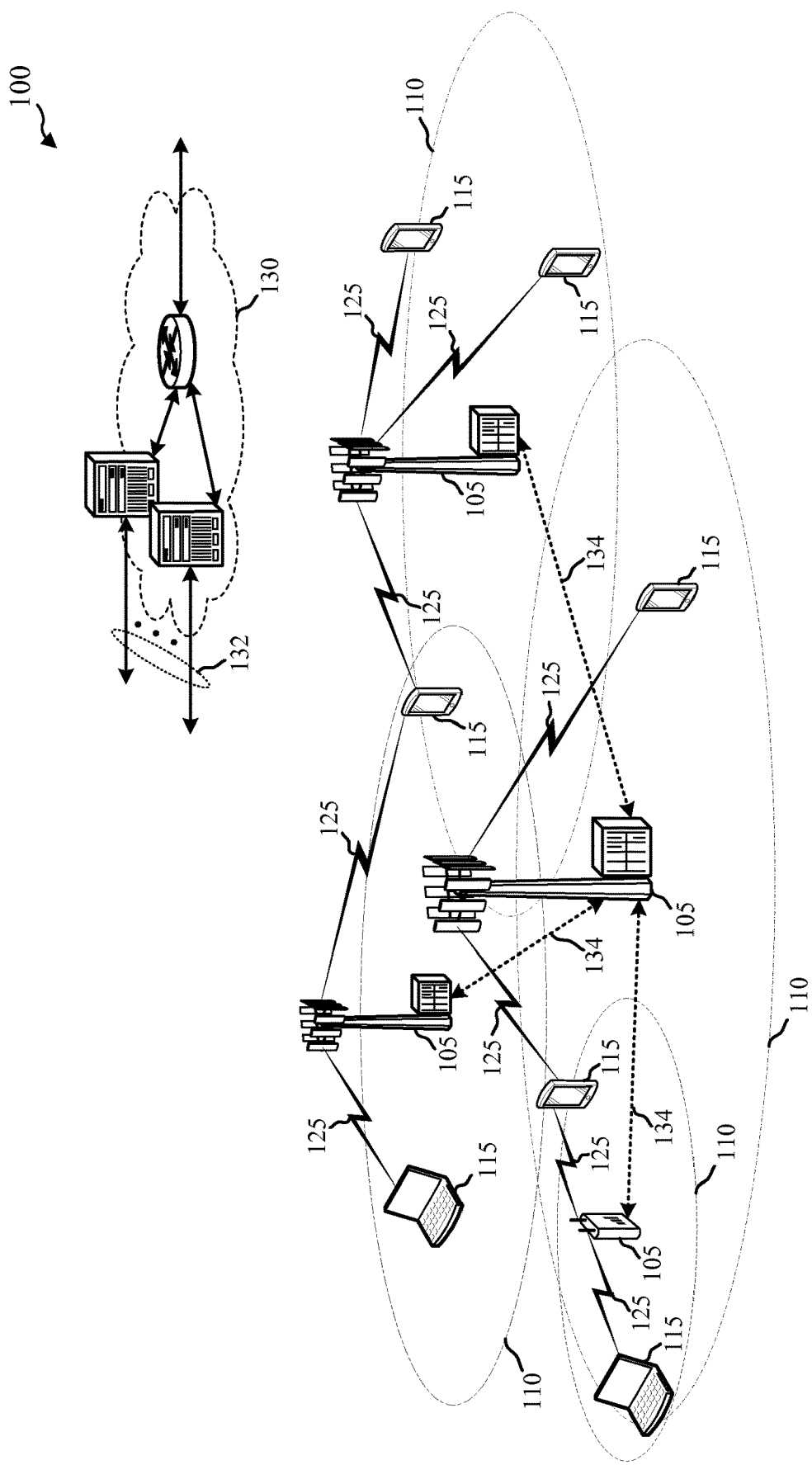
FIG. 1 shows a block diagram of a wireless communication system, in accordance with various aspects of the present disclosure.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 is an LTE/LTE-A network in which base stations 105 and UEs 115 may be configured to operate using two or more different types of communications, such as legacy communications according to established LTE communications protocols, and/or low latency communications having reduced TTIs (and also reduced round trip times) relative to legacy communications. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a Third Generation Partnership Project (3GPP) term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Reserved resources within a system bandwidth of the wireless communications system 100, in some examples, may be identified that are compatible with 3GPP LTE and LTE-A (e.g., compatible with releases 10, 11, and 12), referred to as legacy communications. All or a portion of remaining resources within the system bandwidth may be allocated for other types of communications, such as low latency communications, as will be described in more detail below. Signaling may be used to indicate resources that are allocated for the other communications, and may include signaling to indicate that certain reference signals may be combined.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a machine type communication (MTC) device, a cellular phone, a personal digital assistant (PDA), a wireless modem, a wireless communication device, a handheld device, a tablet computer, a laptop computer, a cordless phone, a wireless local loop (WLL) station, or the like. In some implementations, an MTC device may be included in or operate in conjunction with a vehicle, a sensor, and/or any of numerous other applications that may use MTC devices, such as a meter (e.g., a gas or parking meter), home appliances, healthcare devices, or other monitoring devices. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

As discussed above, various examples provide communications in a wireless communications system, such as wireless communications system 100 of FIG. 1, that may support multiple different types of communications. A first type of communications that may, for example, operate according to a first latency mode may use the frame structure, slots, symbols and subcarrier spacing as specified for legacy LTE communications. For example, time intervals in LTE/LTE-A may be expressed in multiples of a basic time unit (e.g., the sampling period, Ts=1/30,720,000 seconds). Time resources may be organized according to radio frames of length of 10 ms (Tf=307200·Ts), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. Additionally, communications in the first latency mode may be initiated through legacy LTE techniques, such as through paging or control channels for downlink communications, and through scheduling requests and random access procedures for uplink communications.

A second type of communications may, for example, operate according to a second latency mode, or low latency mode in which a round trip time (RTT) between a transmission and acknowledgment of the transmission is reduced relative to the RTT for legacy communications. Additionally, communications in the low latency mode may use symbols having a reduced transmission time interval (TTI), for example through reduced symbol duration relative to legacy LTE symbols. Thus, in some cases, the legacy LTE subframe may be the smallest scheduling unit, or TTI. In other cases, including for systems that support low latency operation or a low latency mode, a TTI may be shorter than a subframe or may be employed in transmission bursts (e.g., in short TTI bursts or in selected component carriers using short TTIs). In some cases, one or more symbols may be used for shorter TTIs, where each TTI may be either an uplink or downlink symbol. The system 100 may support UE 115 operation with TTIs of different durations—in such systems, longer duration TTI may be referred to as legacy TTIs and shorter duration TTIs may be referred to as low latency TTIs. Communications according to the first and/or second types of communications may be provided by allocating resources within the available wireless communications system 100 resources for such communications. For instance, reference signals transmitted in two or more low latency TTIs may be combined.

Figure 2:
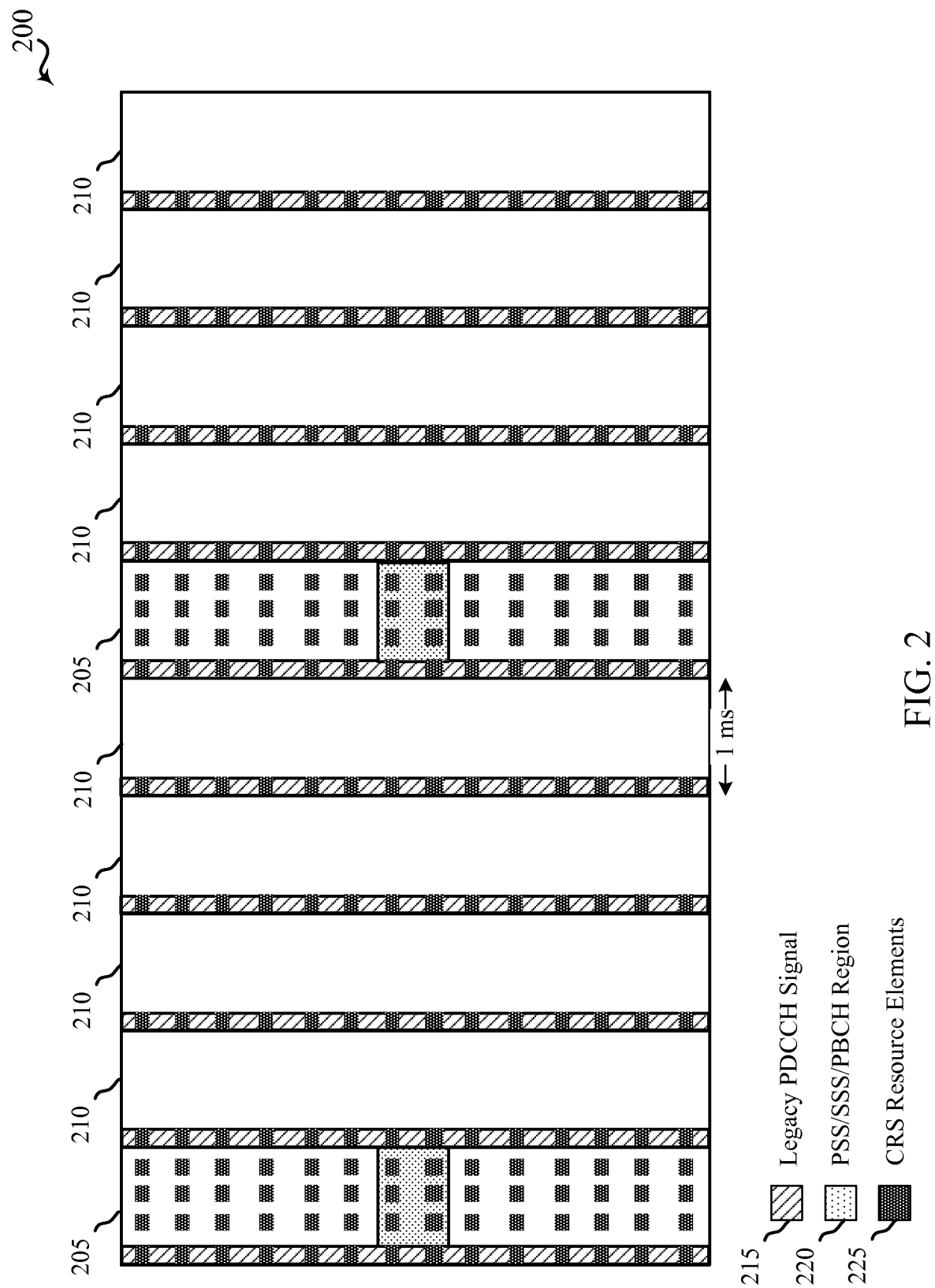
FIG. 2 is a diagram conceptually illustrating an example of a number of subframes and resources for certain reference signals within subframes that may be reserved for legacy communications in a wireless communication system, in accordance with various aspects of the present disclosure.

FIG. 2 is a diagram conceptually illustrating an example of a radio frame 200 and different subframes 205 and 210 that may be transmitted. The radio frame of FIG. 2 may be transmitted using portions of the wireless communications system 100 described with reference to FIG. 1 between one or more base stations 105 and/or one or more UEs 115, for example. As mentioned above, different types of UEs (e.g., UEs 115 of FIG. 1) may be provided and may have different capabilities. For example, a legacy UE may be capable of transmitting and receiving communications according to legacy protocols, while other UEs may be capable of transmitting and receiving low latency or other types of communications. In order to maintain compatibility with legacy UEs, the communications of each of the different communications types may retain a set of resources that can be used for legacy communications with legacy UEs. Legacy protocols may refer to earlier releases of LTE/LTE-A (e.g., LTE/LTE-A Release 12 or earlier), and legacy UEs may refer to UEs implementing such protocols to the exclusion of newer (e.g., LTE/LTE-A post-release 12) versions of a communication standard.

FIG. 2 shows examples of various resources that may be transmitted according to raster spacing recognized by legacy UEs that provides for 1 ms subframes 205, 210 that make up a 10 ms radio frame. Within each subframe 205, 210, a physical downlink control channel (PDCCH) 215 signal is provided in the first symbol of the subframe 205, 210, which may provide various legacy control information. Every fifth subframe, indicated in FIG. 2 as subframes 205, for legacy communications may include certain types of synchronization and broadcast signaling that are expected by legacy UEs. Such signaling may include a primary synchronization signal (PSS), a secondary synchronization signal (SSS), and a physical broadcast channel (PBCH). This signaling is provided in a PSS/SSS/PBCH region 220, in the central six resource blocks of subframes 205. Furthermore, a common reference signal (CRS) 225 is transmitted within the PDCCH 215 and over at least a fraction of system bandwidth in the PSS/SSS subframes 205. CRS 225 may be transmitted on resource that are common to (e.g., decodable by) many or all UEs within a cell. CRS 225 may be broadcast, for instance, and may thus not be transmitted on resources associated with a group identifier (ID) or a UE ID. These resources for legacy communications, according to various examples, may be reserved resources that are maintained to provide compatibility with legacy UEs. The remaining resources may then be shared between legacy channels and one or more other channels, such as low latency channels that provide low latency communications.

Figure 3:
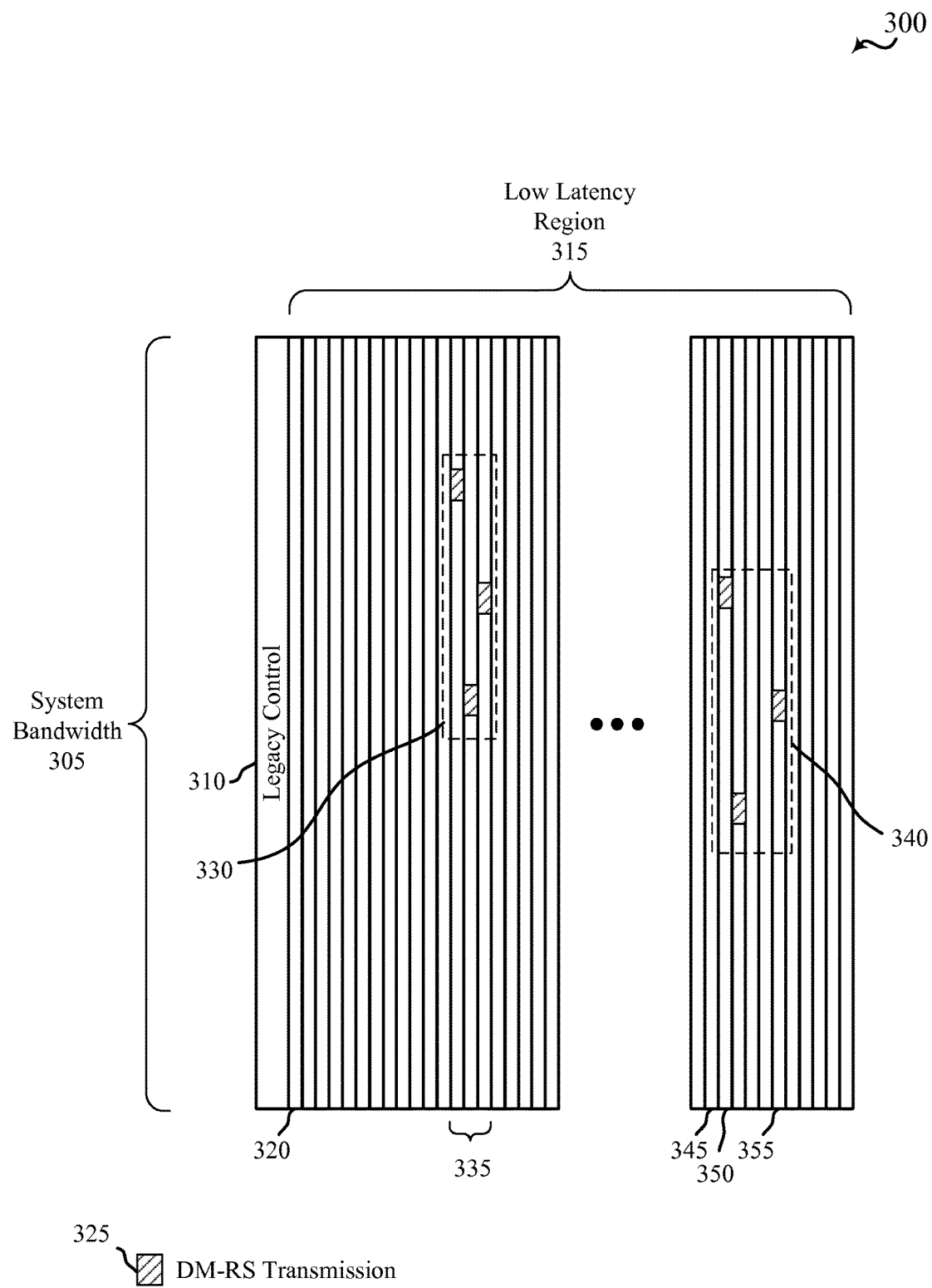
FIG. 3 is a diagram conceptually illustrating an example of legacy and low latency resources, and combinable reference signals, that may be used in a wireless communication system, in accordance with various aspects of the present disclosure.

With reference now to FIG. 3, a block diagram 300 is described that conceptually illustrates an example of low latency communications using different resources of a wireless communications system, in accordance with aspects of the present disclosure. The communications of FIG. 3 may be transmitted using portions of the wireless communications system 100 described with reference to FIG. 1 between one or more base stations 105 (e.g., eNBs) and one or more UEs 115, for example. In the example of FIG. 3, wireless resources within a system bandwidth 305 may include a legacy control region 310 and a low latency region 315. Such a configuration may be used with either FDM or TDM communications. Legacy control region 310 may include, in certain examples, the first one or two symbols of each subframe, which may include various legacy control and signaling information. In some examples, the legacy control region may also include the center six resource blocks and CRS resource elements of certain subframes, such as discussed above with respect to FIG. 2.

Within the low latency region 315, a number of symbols 320 may be transmitted that have a TTI that is reduced relative to a TTI of a legacy symbol. Within one or more of the symbols 320, a base station may transmit a DM-RS 325. DM-RS 325, which may be referred to as UE-RS, may be transmitted on or using resources associated with a UE identification (ID). As mentioned above, in certain examples reference signals, such as DM-RSs 325, may be transmitted in symbols 320 of multiple TTIs. Furthermore, such DM-RSs may be transmitted during PDSCH transmissions, and may have precoding applied to the transmissions. In the event that different transmissions have different precoding, reference signals transmitted during the different TTIs may not be combined to obtain reliable information.

According to certain examples, a base station may determine that one or more UEs may be configured for low latency communications, and may maintain a same precoding across multiple TTIs such that each of the one or more UEs may combine the reference signals from the multiple TTIs. In some examples, such as illustrated in FIG. 3, a UE may implicitly determine that multiple DM-RS transmissions from different symbols 320 may be combined. Such implicit determination may be made, for example, based on characteristics of scheduling of different TTIs to the UE. In some examples, a set of DM-RS transmissions 330 may be combined if a UE is scheduled on consecutive TTIs 335. For example, a UE may combine reference signals within two or more consecutive TTIs, and may average the reference signals from the multiple TTIs to provide enhanced demodulation of downlink transmissions. In some examples, if a UE was not scheduled in the previous TTI, the UE may use a reference signal from the current TTI, and if the UE was scheduled in one or more previous TTI, the UE may use previous reference signals (of the same ports). Such implicit determination of combining may be nested to multiple TTIs, in some examples.

In some examples, a UE may implicitly determine that reference signals may be combined when reference signals are not transmitted in consecutive symbols 320, but are transmitted in one or more non-adjacent symbols 320. In the example of FIG. 3, a set of DM-RS transmissions 340 may be transmitted during adjacent symbols 345 and 350, and in non-adjacent symbol 355. In this example, if a UE is scheduled at least once in the past N TTIs, UE may combine reference signals the grant(s) from within the period. For example, if a UE is scheduled in a current TTI and at least one in the past N (e.g., 3, 5, 6, etc.) TTIs, the UE may combine reference signals from the different TTIs. If the UE was not scheduled within past N TTIs, the UE may just use a reference signal from the current TTI. In some examples, the combining of reference signals may be nested to go further back to previous scheduled TTIs.

Through combination of such DM-RS 325 transmissions, a system may maintain the benefit of legacy DM-RS transmissions, while also determining more accurate channel noise estimation (no partial loading). Furthermore, such combining may enable on-demand pilot overhead and reduced control overhead (i.e., no PMI signaling). Such combining may also assist with enhanced MIMO operation and/or enhanced coordinated multi-point (CoMP) operations.

Figure 4:
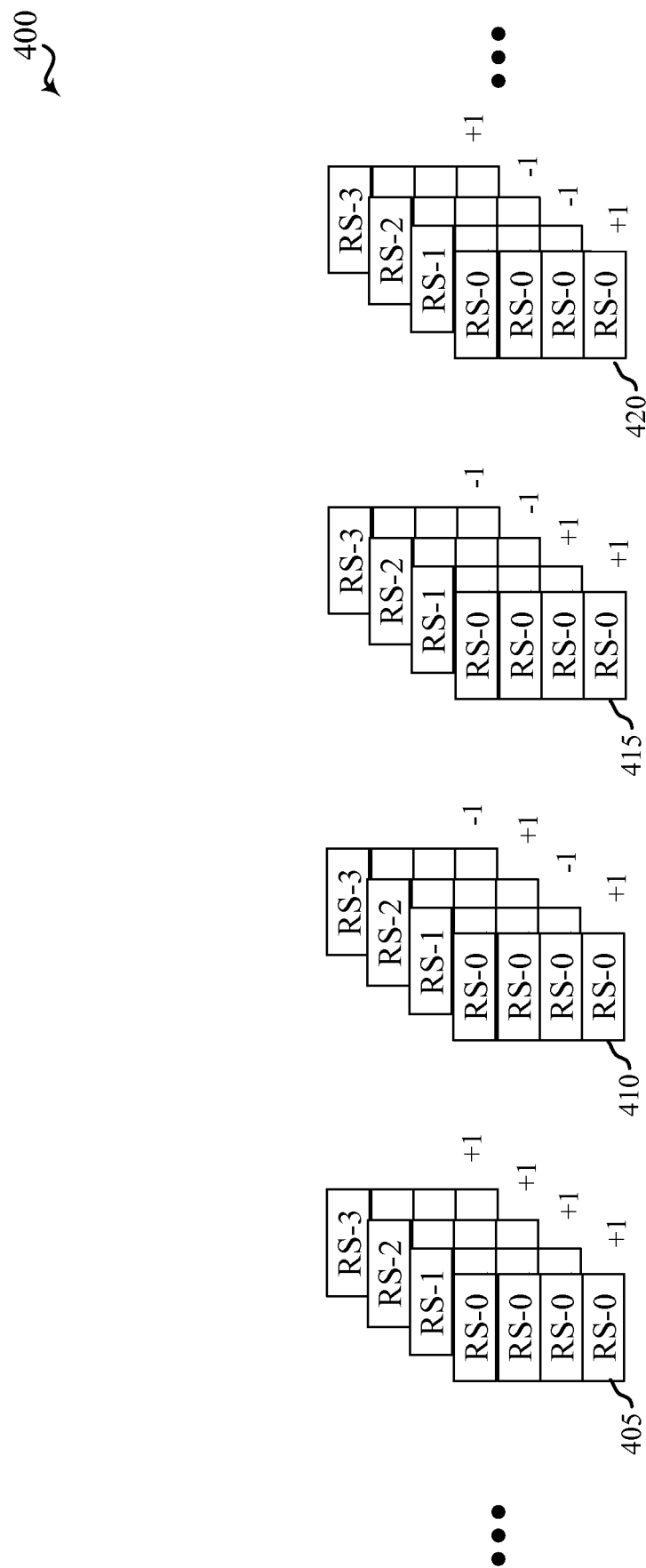
FIG. 4 is a diagram conceptually illustrating an example of a pilot structure for reference signal transmissions in a wireless communication system, in accordance with various aspects of the present disclosure.

A structure of combinable reference signals (which may be referred to as a group reference signal (GRS)), such as DM-RS 325 transmission in the sets of DM-RS transmissions 330 and 340, may be established according to certain examples to provide adequate separation of the DM-RS transmissions and may include DM-RS reference signals that are indicated as combinable. In some cases, UE-specific reference signals may be combinable, and may be indicated as combinable. In some cases, GRSs are associated with a group ID, as described further below. That is, a GRS may be transmitted on or using resources associated with a group ID. FIG. 4 illustrates an example of a pilot structure 400 for reference signal transmissions in a wireless communications system. In this example, the pilot structure 400 uses code division multiplexing (CDM) and uses an orthogonal cover code (OCC) to enable code-domain separation for four antenna ports. Resource element allocations for each reference signal are the same for each of the multiple ports (e.g., 4 ports) for a TTI, and orthogonality may be achieved by applying OCC to the sequences mapped onto the reference signals transmitted during TTIs 405, 410, 415, and 420. A four digit OCC (e.g., +1, +1, +1, +1) may be determined according legacy protocols for OCC mapping specified for antenna ports, according to certain examples.

Using CDM with OCC, each individual observation of TTIs 405 through 420 can provide channel estimates for all reference signal antenna ports. Furthermore, in certain examples, any consecutive four observations (e.g., observations for TTIs 405-420) up to a current reference symbol can offer separation of signals from different ports. Additionally, according to some examples, any consecutive two observations may allow separation of two ports from others with the time domain OCC. In certain examples, channel separation may be achieved through interference cancellation (IC) techniques. While CDM is illustrated in FIG. 4 for multiplexing antennas, various other examples may use different options for multiplexing antennas, such as time domain multiplexing (TDM), frequency division multiplexing (FDM), or hybrids of TDM/FDM/CDM. Transmitted reference signals, in some examples, may occupy full system bandwidth or part of the system bandwidth. Furthermore, as briefly discussed above, in certain examples the same reference signals may be shared among control channels (e.g., PDCCH transmissions) and data channels (e.g., PDSCH transmissions), unlike legacy PDCCH and PDSCH which use separate DM-RS.

In some examples, a structure of combinable reference signals, may be transmitted on established common ports, or may be transmitted on ports that are dynamically scheduled. For example, some GRS ports (e.g., port 0 and 1) may be present even without associated traffic, and thus may be common GRS ports that may be combined with other GRS transmissions. Such signals may be turned on and off semi-statically, based in the type of traffic, channel conditions, etc., according to various examples. In some examples, reference signal transmissions on the common GRS ports are not precoded. In addition to the common GRS ports, some GRS ports may be dynamically scheduled and be present with associated data traffic. The reference signals transmitted using such dynamic ports may be precoded, and may be combined, for example, based on determinations such as described herein with reference to FIGS. 3, 5, and 6. When transmitting control channel transmissions (e.g., PDCCH transmissions), in some examples, for the initial transmission to the UE, PDCCH reference signals may be transmitted on CRS or GRS. Subsequently, in such examples, the UE may be configured through higher-layer signaling with the dynamic GRS port index (indices) for PDCCH, after which PDCCH may be sent to the UE either via CRS or common GRS ports or via the configured dynamic GRS port(s). When transmitting shared channel transmissions (e.g., PDSCH transmissions), a PDCCH grant may contain a port index and rank, and transmission reference signals may be transmitted either via CRS or common GRS or dynamic GRS, according to various examples.

Figure 5:
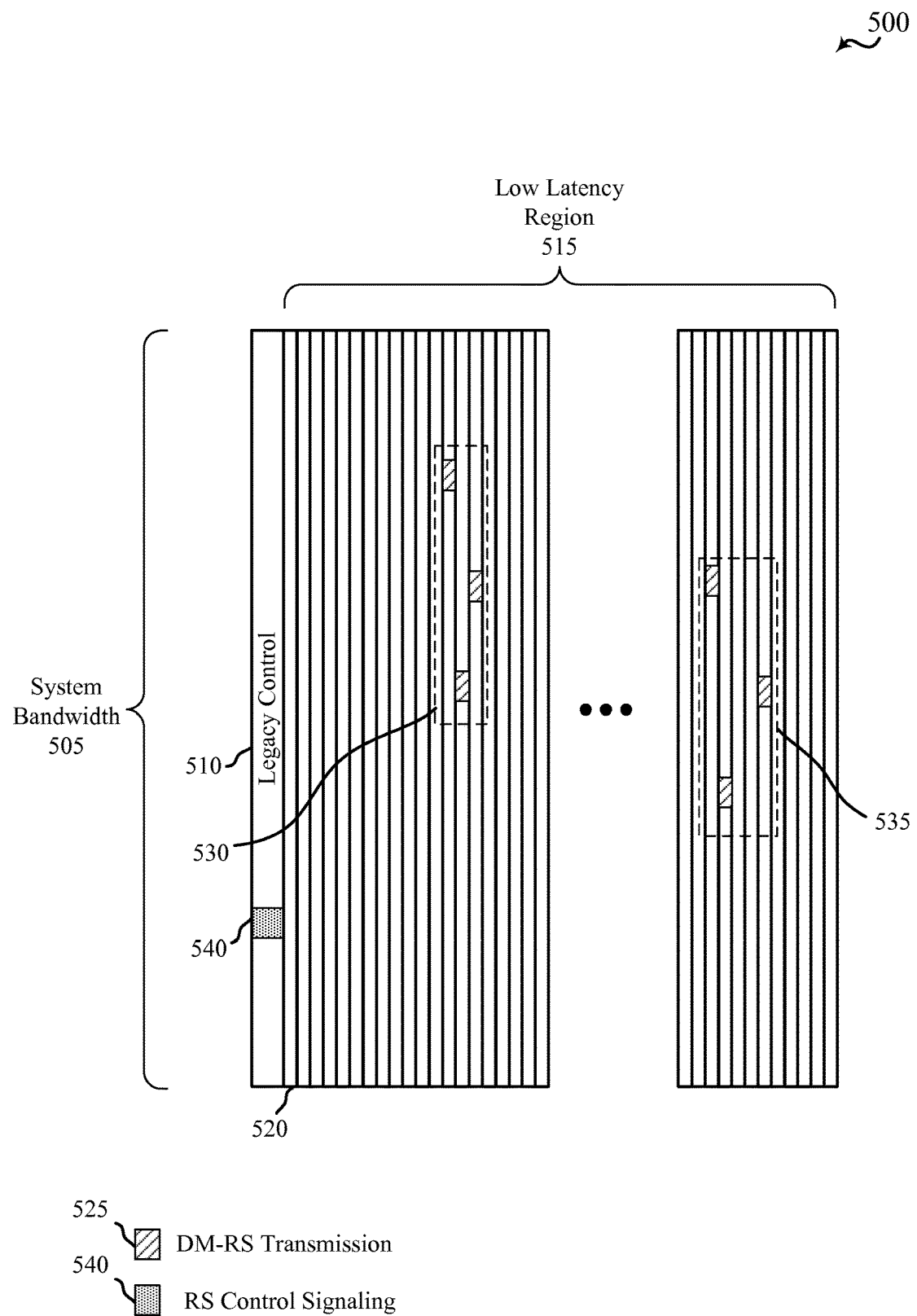
FIG. 5 is a diagram conceptually illustrating an example of legacy and low latency resources, and reference signal control signaling, that may be used in a wireless communication system, in accordance with various aspects of the present disclosure.

With respect to low latency type communications, FIG. 5 is a diagram 500 conceptually illustrating an example of low latency communications using different resources of a wireless communication system, in accordance with aspects of the present disclosure. The communications of FIG. 5 may be transmitted using portions of the wireless communications system 100 described with reference to FIG. 1 between one or more base stations 105 (e.g., eNBs) and one or more UEs 115, for example. In the example of FIG. 5, wireless resources within a system bandwidth 505 may include a legacy control region 510 and a low latency region 515. Such a configuration may be used with either FDM or TDM communications. Legacy control region 510 may include, in certain examples, the first one or two symbols of each subframe, which may include various legacy control and signaling information. In some examples, the legacy control region may also include the center six resource blocks and CRS resource elements of certain subframes, such as discussed above with respect to FIG. 2.

Within the low latency region 515, a number of symbols 520 may be transmitted that have a TTI that is reduced relative to a TTI of a legacy symbol, similarly as discussed above with respect to FIG. 3. Within one or more of the symbols 520, a base station may transmit a DM-RS 525. As mentioned above, in certain examples reference signals, such as DM-RSs 525, may be transmitted in symbols 530 of multiple TTIs, and DM-RSs 525 may be transmitted using resources associated with a UE ID. Furthermore, such DM-RSs may be transmitted during PDSCH transmissions, and may have precoding applied to the transmissions. In the event that different transmissions have different precoding, reference signals transmitted during the different TTIs may not be combined to obtain reliable information. According to certain examples, reference signal (RS) control signaling 540 may be transmitted to a UE that includes an indication that certain DM-RS 525 transmissions may be combined. Such control signaling 540 may indicate that a set of DM-RS 530 transmissions may be combined, and/or that another set of DM-RS transmissions 535 may be combined.

According to certain examples, a base station may determine that one or more UEs may be configured for low latency communications, and may maintain a same precoding across multiple TTIs such that the UE may combine the reference signals from the multiple TTIs. In some examples, the RS control signaling 540 may be included in a scheduling grant transmitting via the PDCCH that contains information on whether a UE may combine reference signals from previous TTI(s) or previous grants. In some examples, the grant may explicitly contain one or more bits to convey reference signal TTI bundling information indicating that certain reference signals may be combined. In some examples, the bundling information may be nested to multiple TTIs. In certain examples, the RS control signaling 540, rather than containing one or more bits to convey control information may signal that a UE may combine reference signals based on a PDCCH format used for the control channel transmission. In some examples, different PDCCH formats may be mapped and used to determine that two or more reference signals transmitted in different TTIs may be combined. In still further examples, the RS control signaling may be provided based on a specific transmission scheme included in a scheduling grant for the PDSCH in a TTI. Such specific transmissions schemes may be mapped to determine that two or more reference signals transmitted in different TTIs may be combined. Such transmission schemes may include, for example, space frequency block coding (SFBC), open loop spatial multiplexing, and closed loop spatial multiplexing, to name but a few. When a UE decodes the scheduling grant, and if the grant allows, the UE (if the UE was awake in the previous TTI(s)) may utilize previous reference signals for improved channel estimation for PDSCH decoding, according to certain examples. In some examples, once the UE decodes scheduling grant, and if the grant allows, the UE may utilize reference signal(s) in previous grant(s) for improved channel estimation for PDSCH decoding. In some further examples, a UE may use a hybrid scheme of implicit determination that reference signals may be combined along with explicit signaling. For example, for PDCCH transmissions a UE may use implicit signaling for determining that reference signals may be combined, and for PDSCH, transmissions the UE may use explicit signaling such as described with respect to FIG. 5. Similarly, for certain spatial schemes, implicit signaling may be used, and for other spatial schemes explicit signaling may be used for determining that reference signals may be combined across TTIs.

Similarly as discussed with respect to FIG. 3, through combining of such DM-RS transmissions 525, a system may maintain the benefit of legacy DM-RS transmissions, and may determine more accurate channel noise estimation.

Furthermore, such combining may enable on-demand pilot overhead and reduced control overhead (i.e., no PMI signaling). Such combining may also assist with enhanced MIMO operation and/or enhanced coordinated multi-point (CoMP) operations.

Figure 6:
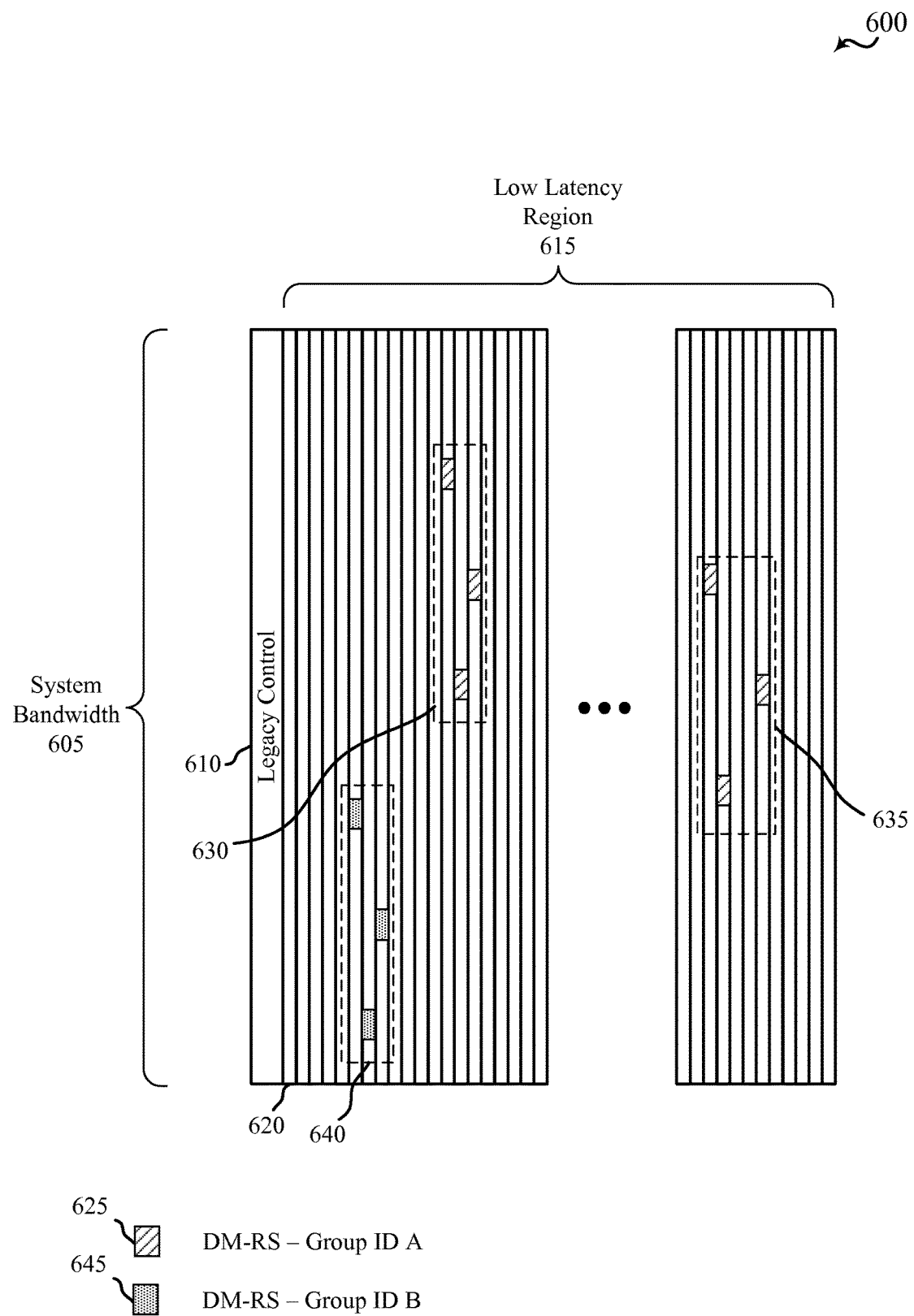
FIG. 6 is a diagram conceptually illustrating an example of legacy and low latency resources, and group ID-based combining of reference signals, that may be used in a wireless communication system, in accordance with various aspects of the present disclosure.

FIG. 6 is a diagram 600 conceptually illustrating an example of low latency communications using different resources of a wireless communications system, in accordance with aspects of the present disclosure. The communications of FIG. 6 may be transmitted using portions of the wireless communications system 100 described with reference to FIG. 1 between one or more base stations 105 (e.g., eNBs) and one or more UEs 115, for example. In the example of FIG. 6, wireless resources within a system bandwidth 605 may include a legacy control region 610 and a low latency region 615. Such a configuration may be used with either FDM or TDM communications. Legacy control region 610 may include, in certain examples, the first one or two symbols of each subframe, which may include various legacy control and signaling information. In some examples, the legacy control region may also include the center six resource blocks and CRS resource elements of certain subframes, such as discussed above with respect to FIG. 2.

Within the low latency region 615, a number of symbols 620 may be transmitted that have a TTI that is reduced relative to a TTI of a legacy symbol. That is, the symbols 620 may be TTIs of a shorter duration than a legacy TTI. In some cases, the symbols 620 are low latency TTIs that have a duration equal to an LTE symbol period, a LTE slot period, two LTE symbol periods, etc., and a duration that is less than the duration of an LTE subframe. Within one or more of the symbols 620, a base station may transmit a DM-RS 625. As mentioned above, in certain examples reference signals, such as DM-RSs 625, may be transmitted in symbols 620 of multiple TTIs. Furthermore, such DM-RSs may be transmitted during PDSCH transmissions, and may have precoding applied to the transmissions. In the event that different transmissions have different precoding, reference signals transmitted during the different TTIs may not be combined to obtain reliable information.

According to certain examples, a base station may determine that one or more UEs may be configured for low latency communications, may identify groups of UEs, and may maintain a same precoding across multiple TTIs within a group of UEs such that the associated UEs may combine the reference signals from the multiple TTIs. In some examples, such as illustrated in FIG. 6, a first UE may determine an associated group identification (ID) such as, for example, group ID A, and that certain DM-RSs 625 are associated with group ID A. The UE, after making such a determination, may combine multiple reference signals (e.g., DM-RS 625) from different sets of reference signals 630, 635 that correspond to the same group ID as the UE. A second set of reference signals 640, in this example, may contain DM-RSs 645 of group ID B, which may be combined in a similar manner. The GRS (e.g., combinable reference signals associated with group ID A or group ID B) may thus be transmitted on resources associated with a group ID or a UE ID such that the specified group of UEs may receive and combine the GRS.

In some examples, a UE may determine that reference signals of a particular group ID, may be combined where the group ID corresponds to a same group ID as the UE. In some examples, a UE may be pre-configured with a group ID. In other examples, a UE may be provided with a group ID based on, for example, higher layer signaling or unicast data on legacy carrier. Some base stations or eNBs may dynamically manage groups of UEs based on UE PMI feedback. In certain examples, each group ID may be associated with a DM-RS scrambling sequence, with UEs having the same scrambling sequence being assigned to a same group. A UE, in some examples, may detect the presence/absence of transmission for each dynamic group reference signal ports based on energy detection, and a UE may combine reference signals from a base station to any UE within the group.

Through combining of such DM-RS 625 and 645 transmissions, a system may maintain the benefit of legacy DM-RS transmissions, while also determining more accurate channel noise estimation (no partial loading). Furthermore, such combining may enable on-demand pilot overhead and reduced control overhead (i.e., no PMI signaling). Such combining may also provide for enhanced MIMO operation and/or enhanced coordinated multi-point (CoMP) operations.

Figure 7:
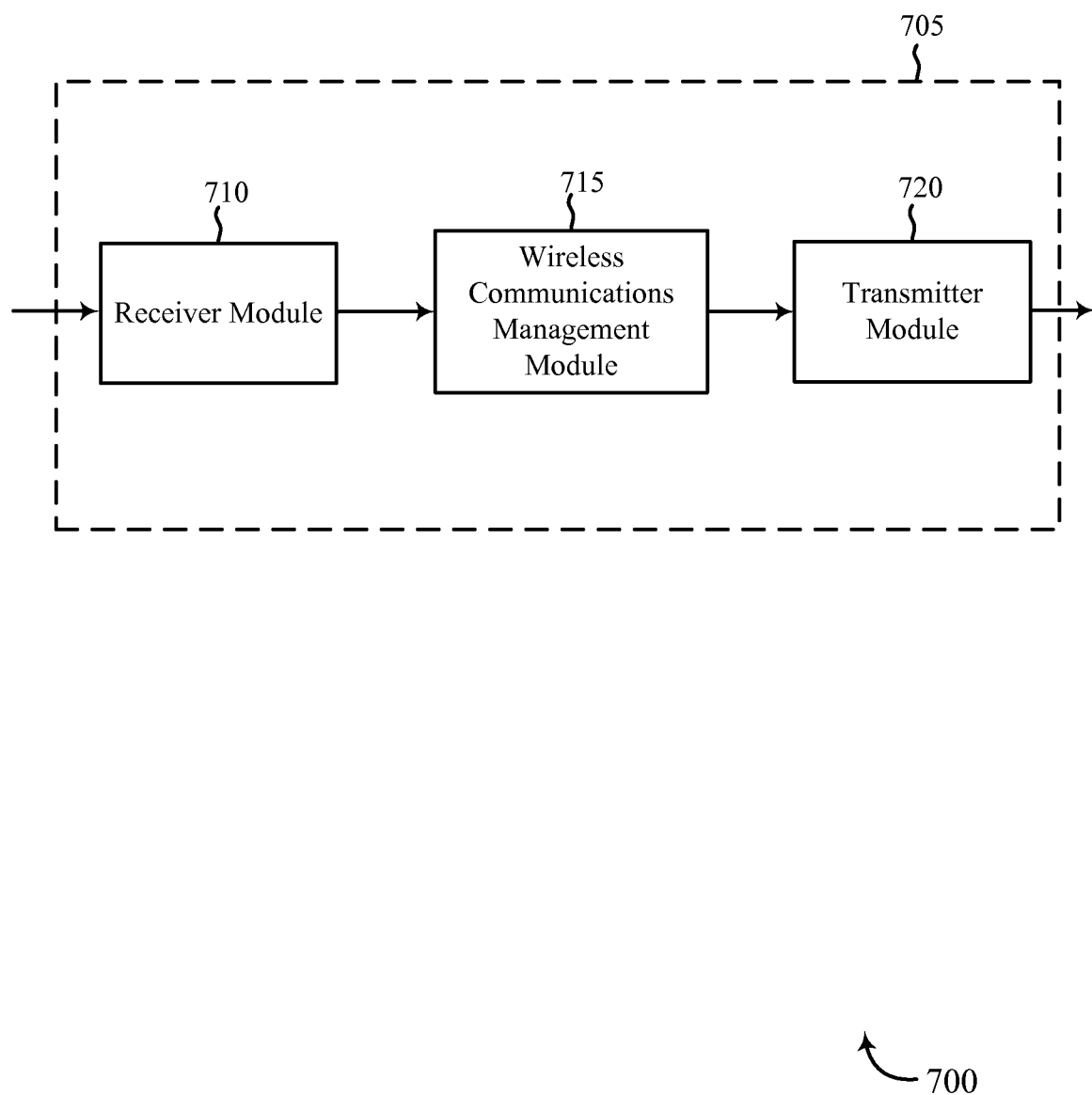
FIG. 7 shows a block diagram of a device configured for use in wireless communication, in accordance with various aspects of the present disclosure.

FIG. 7 shows a block diagram 700 of a device 705 for use in wireless communication, in accordance with various aspects of the present disclosure. The device 705 may be an example of one or more aspects of a UE 115 described with reference to FIG. 1, for example. The device 705 may include a receiver module 710, a wireless communications management module 715, and/or a transmitter module 720. The device 705 may also be or include a processor (not shown). Each of these modules may be in communication with each other.

The modules depicted in device 705 may, individually or collectively, be implemented using one or more application-specific integrated circuits (ASICs) adapted to perform some or all of the applicable functions in hardware. Additionally or in the alternative, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver module 710 may receive information such as packets, user data, and/or control information associated with various information channels (e.g., control channels, data channels, etc.) and according to one or more different communications types (e.g., legacy LTE communications, low latency communications, etc.). The receiver module 710 may be configured to receive, for example, signaling indicating that multiple reference signals may be combined for channel estimation. Information may be passed on to the wireless communications management module 715 that may combine associated reference signals, and to other components of the device 705.

The wireless communications management module 715 may be configured to perform various functions related to identifying reference signals to be combined, combining reference signals, and performing channel estimation based on the combined reference signals, which may be an example of the functions described above with reference to FIGS. 2-6.

The transmitter module 720 may transmit the one or more signals received from other components of the device 705. The transmitter module 720 may transmit wireless transmissions using allocated resources and according to the type of services that are identified by the wireless communications management module 715. In some examples, the transmitter module 720 may be collocated with the receiver module 710 in a transceiver module (not shown).

Figure 8:
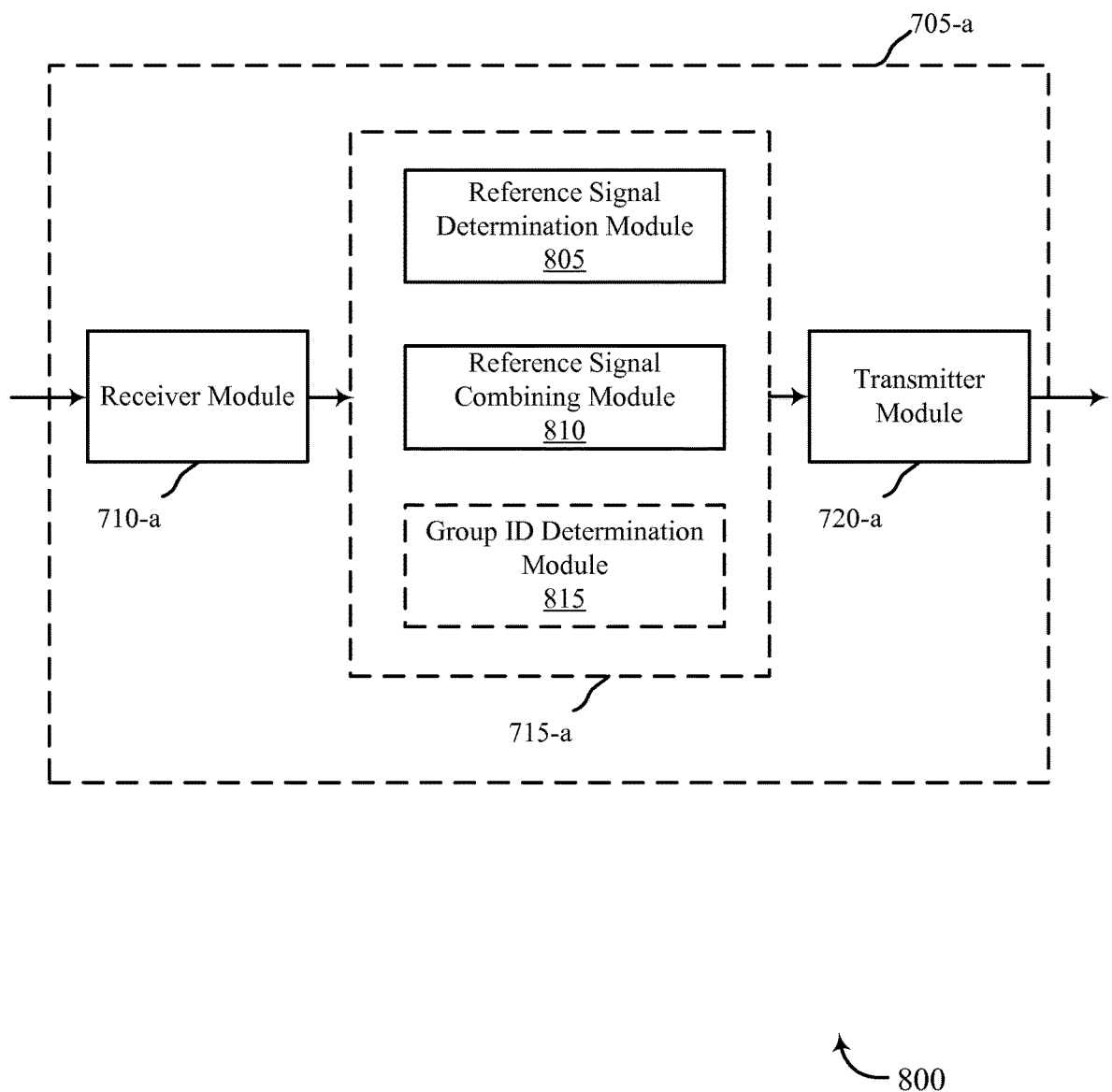
FIG. 8 shows a block diagram of a device configured for use in wireless communication, in accordance with various aspects of the present disclosure.

FIG. 8 shows a block diagram 800 of a device 705-*a* for use in wireless communication, in accordance with various examples. The device 705-*a* may be an example of one or more aspects of a UE 115 described with reference to FIG. 1. It may also be an example of a device 705 described with reference to FIG. 7. The device 705-*a* may include a receiver module 710-*a*, a wireless communications management module 715-*a*, and/or a transmitter module 720-*a*, which may be examples of the corresponding modules of device 705. The device 705-*a* may also include a processor (not shown). Each of these modules may be in communication with each other. The wireless communications management module 715-*a* may include a reference signal determination module 805, a reference signal combining module 810, and an optional group ID determination module 815. The receiver module 710-*a* and the transmitter module 720-*a* may perform the functions of the receiver module 710 and the transmitter module 720, of FIG. 7, respectively.

Within the wireless communications management module 715-*a*, reference signal determination module 805 may determine the presence of one or more reference signals from one or more TTIs, and whether such reference signals may be combined to provide enhanced channel estimation. For example, reference signal determination module 805 may receive reference signals from multiple TTIs used for low latency communications along with explicit signaling indicating that certain reference signals may be combined, in a manner similarly as discussed above with respect to FIGS. 2-6. Furthermore, in some examples, the reference signal determination module 805 may determine implicit indications that might indicate certain reference signals from different TTIs may be combined, in a manner similarly as discussed above with respect to FIGS. 2-6. In further examples, reference signal determination module 805 may receive an indication from group ID determination module 815 that reference signals for UEs having a same group ID may be combined, in a manner similarly as discussed above with respect to FIGS. 2-6. Reference signal combining module 810, in some example, may combine identified reference signals and provide an averaged (or otherwise combined) reference signal that may be used for enhanced channel estimation, in a manner similarly as discussed above with respect to FIGS. 2-6.

Figure 9:
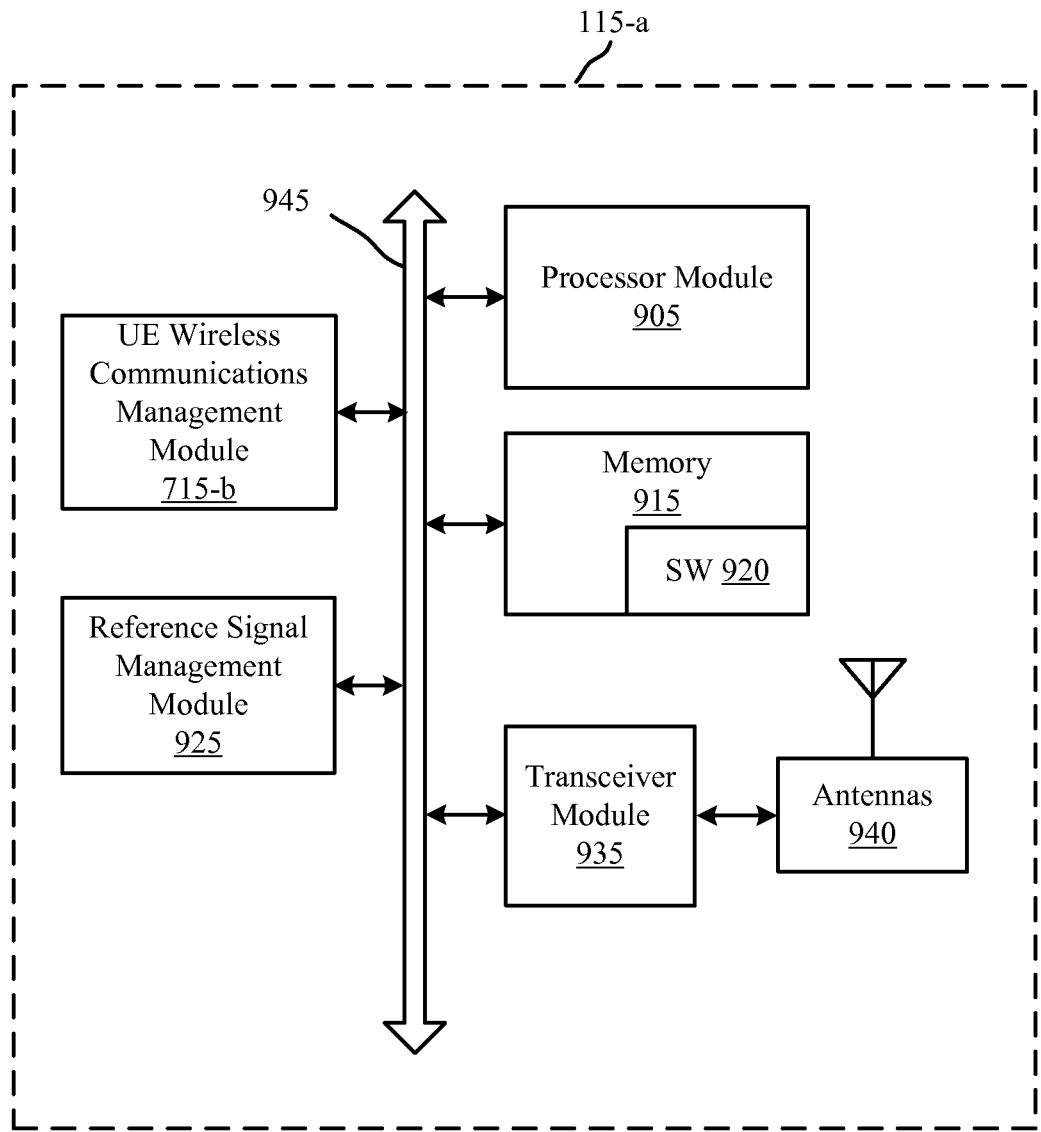
FIG. 9 shows a block diagram of a wireless communication system, in accordance with various aspects of the present disclosure.

FIG. 9 shows a system 900 for use in wireless communication, in accordance with various examples. System 900 may include a UE 115-*a*, which may be an example of the UEs 115 of FIG. 1. UE 115-*a* may also be an example of one or more aspects of devices 705 of FIGS. 7 and/or 8.

The UE 115-*a* may include components for bi-directional voice and data communications including components for transmitting communications and components for receiving communications. The UE 115-*a* may include antenna(s) 940, a transceiver module 935, a processor module 905, and memory 915 (including software (SW) 920), which each may communicate, directly or indirectly, with each other (e.g., via one or more buses 945). The transceiver module 935 may be configured to communicate bi-directionally, via the antenna(s) 940 and/or one or more wired or wireless links, with one or more networks, as described above. For example, the transceiver module 935 may be configured to communicate bi-directionally with base stations 105, such as discussed with reference to FIGS. 1-6. The transceiver module 935 may include a modem configured to modulate the packets and provide the modulated packets to the antenna(s) 940 for transmission, and to demodulate packets received from the antenna(s) 940. The transceiver module 935 may be capable of concurrently communicating with one or more base stations 105 via multiple component carriers.

The UE 115-*a* may include a wireless communications management module 715-*b*, which may perform the functions described above for the wireless communications management modules 715 of device 705 of FIGS. 7 and 8. The UE 115-*a* may also include a reference signal management module 925 that may handle operations related to low latency communications and associated reference signals, as discussed above with respect to FIGS. 2-6.

The memory 915 may include random access memory (RAM) and read-only memory (ROM). The memory 915 may store computer-readable, computer-executable software/firmware code 920 containing instructions that are configured to, when executed, cause the processor module 905 to perform various functions described herein (e.g., determinations related to combining reference signals, and combining reference signals, etc.). Alternatively, the computer-readable, computer-executable software/firmware code 920 may not be directly executable by the processor module 905 but be configured to cause a computer (e.g., when compiled and executed) to perform functions described herein. The processor module 905 may include an intelligent hardware device, e.g., a central processing unit (CPU), a microcontroller, an application-specific integrated circuit (ASIC), etc.

Figure 10:
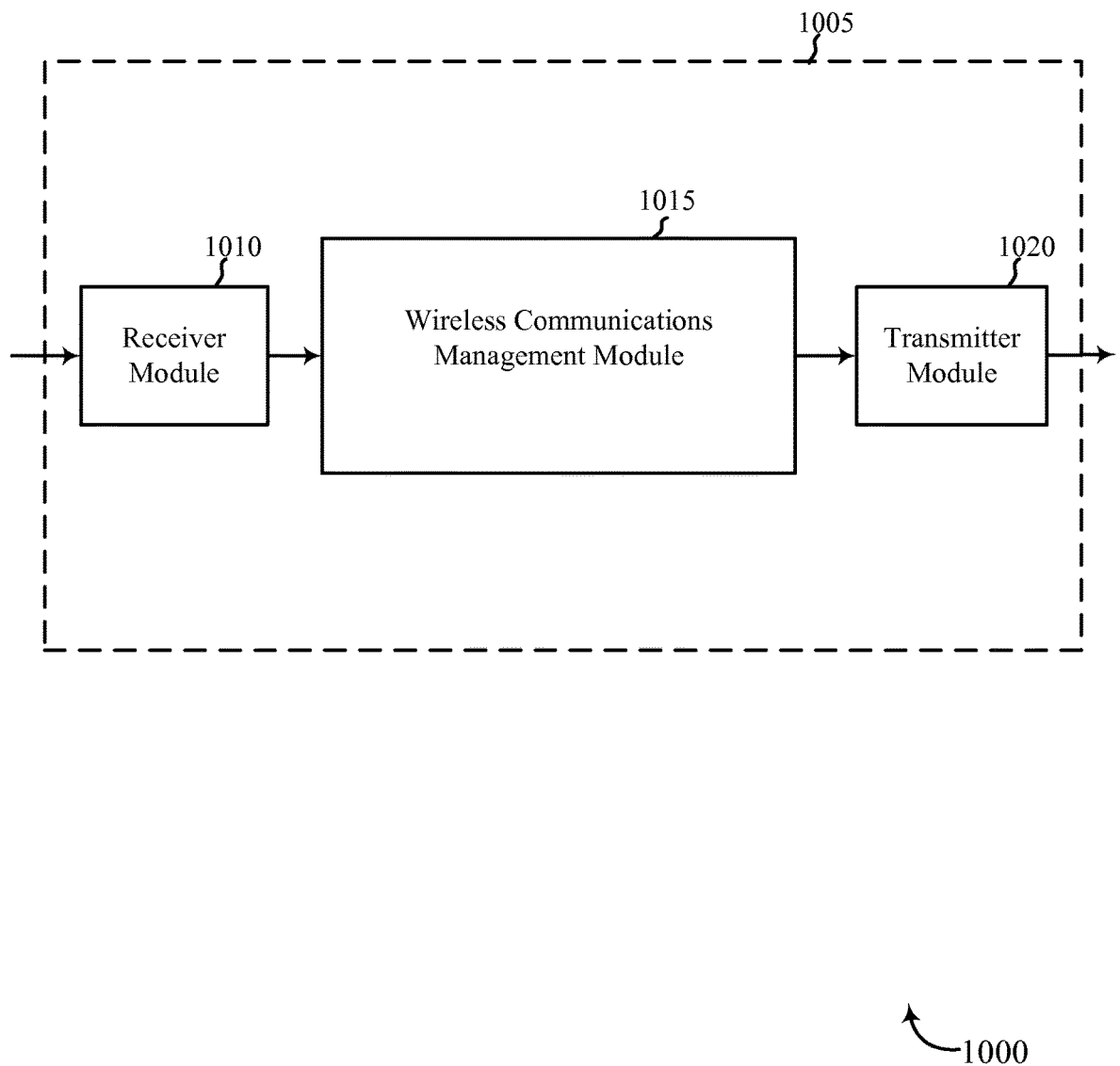
FIG. 10 shows a block diagram of an apparatus for use in wireless communication, in accordance with various aspects of the present disclosure.

FIG. 10 shows a block diagram 1000 of an apparatus 1005 for use in wireless communication, in accordance with various aspects of the present disclosure. In some examples, the apparatus 1005 may be an example of aspects of one or more of the base stations 105 described with reference to FIG. 1. In some examples, the apparatus 1005 may be part or include an LTE/LTE-A eNB and/or an LTE/LTE-A base station. The apparatus 1005 may also be a processor. The apparatus 1005 may include a receiver module 1010, a wireless communications management module 1015, and/or a transmitter module 1020. Each of these modules may be in communication with each other.

The components of the apparatus 1005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver module 1010 may include at least one radio frequency (RF) receiver, such as an RF receiver operable to receive communications according to different communications types, for example. The receiver module 1010 may be used to receive various types of data and/or control signals (i.e., transmissions) over one or more communication links of a wireless communication system, such as one or more communication links of the wireless communications system 100 described with reference to FIG. 1.

In some examples, the transmitter module 1020 may include at least one RF transmitter, such as at least one RF transmitter operable to transmit communications according to different communications types, for example. The transmitter module 1020 may be used to transmit various types of data and/or control signals (i.e., transmissions) over one or more communication links of a wireless communication system, such as one or more communication links of the wireless communications system 100 described with reference to FIG. 1. In some examples, the wireless communications management module 1015 may perform various functions related to identifying UEs capable of certain communications (e.g., low latency communications) and that may combine reference signals such as DM-RSs, signaling that reference signals may be combined, and/or grouping two or more UEs into a group of UEs that may combine reference signals for any UE of the group, which may be an example of the functions described above with reference to FIGS. 2-6.

Figure 11:
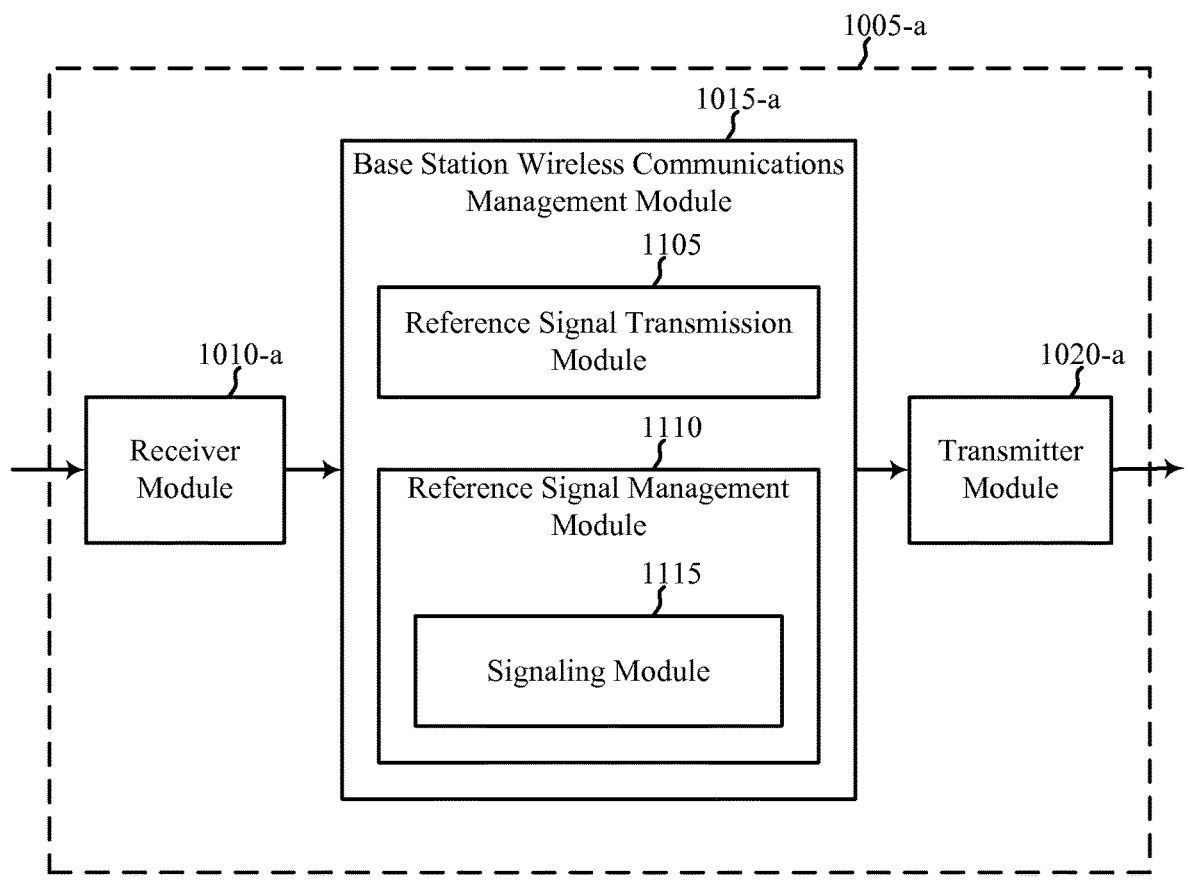
FIG. 11 shows a block diagram of an apparatus for use in wireless communication, in accordance with various aspects of the present disclosure.

FIG. 11 shows a block diagram 1100 of an apparatus 1005-*a* for use in wireless communication, in accordance with various aspects of the present disclosure. In some examples, the apparatus 1005-*a* may be an example of aspects of one or more of the base stations 105 described with reference to FIG. 1, and/or an example of aspects of the apparatus 1005 described with reference to FIG. 10. In some examples, the apparatus 1005-*a* may be part or include an LTE/LTE-A eNB and/or an LTE/LTE-A base station. The apparatus 1005-*a* may also be a processor. The apparatus 1005-*a* may include a receiver module 1010-*a*, a wireless communications management module 1015-*a*, and/or a transmitter module 1020-*a*. Each of these modules may be in communication with each other.

The components of the apparatus 1005-*a* may be, individually or collectively, implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver module 1010-*a* may be an example of one or more aspects of the receiver module 1010 described with reference to FIG. 10. In some examples, the receiver module 1010-*a* may include at least one radio frequency (RF) receiver, such as at least one RF receiver operable to receive communications according to different communications types. The receiver module 1010-*a* may be used to receive various types of data and/or control signals (i.e., transmissions) over one or more communication links of a wireless communication system, such as one or more communication links of the wireless communications system 100 described with reference to FIG. 1.

In some examples, the transmitter module 1020-*a* may be an example of one or more aspects of the transmitter module 1020 described with reference to FIG. 10. In some examples, the transmitter module 1020-*a* may include at least one RF transmitter, such as at least one RF transmitter operable to transmit communications according to different communications types. The transmitter module 1020-*a* may be used to transmit various types of data and/or control signals (i.e., transmissions) over one or more communication links of a wireless communications system, such as one or more communication links of the wireless communications system 100 described with reference to FIG. 1.

Within the wireless communications management module 1015-*a*, reference signal transmission module 1105 may transmit reference signals for use in channel estimation by one or more UEs, for example. Furthermore, in some examples, reference signal management module 1110 may determine that multiple references signals may be combined, and therefore maintain a same precoding that is applied to such reference signals, in a manner similarly as discussed above with respect to FIGS. 2-6. Signaling module 1115, in some examples, may provide signaling indicating that reference signals from two or more TTIs may be combined.

Figure 12:
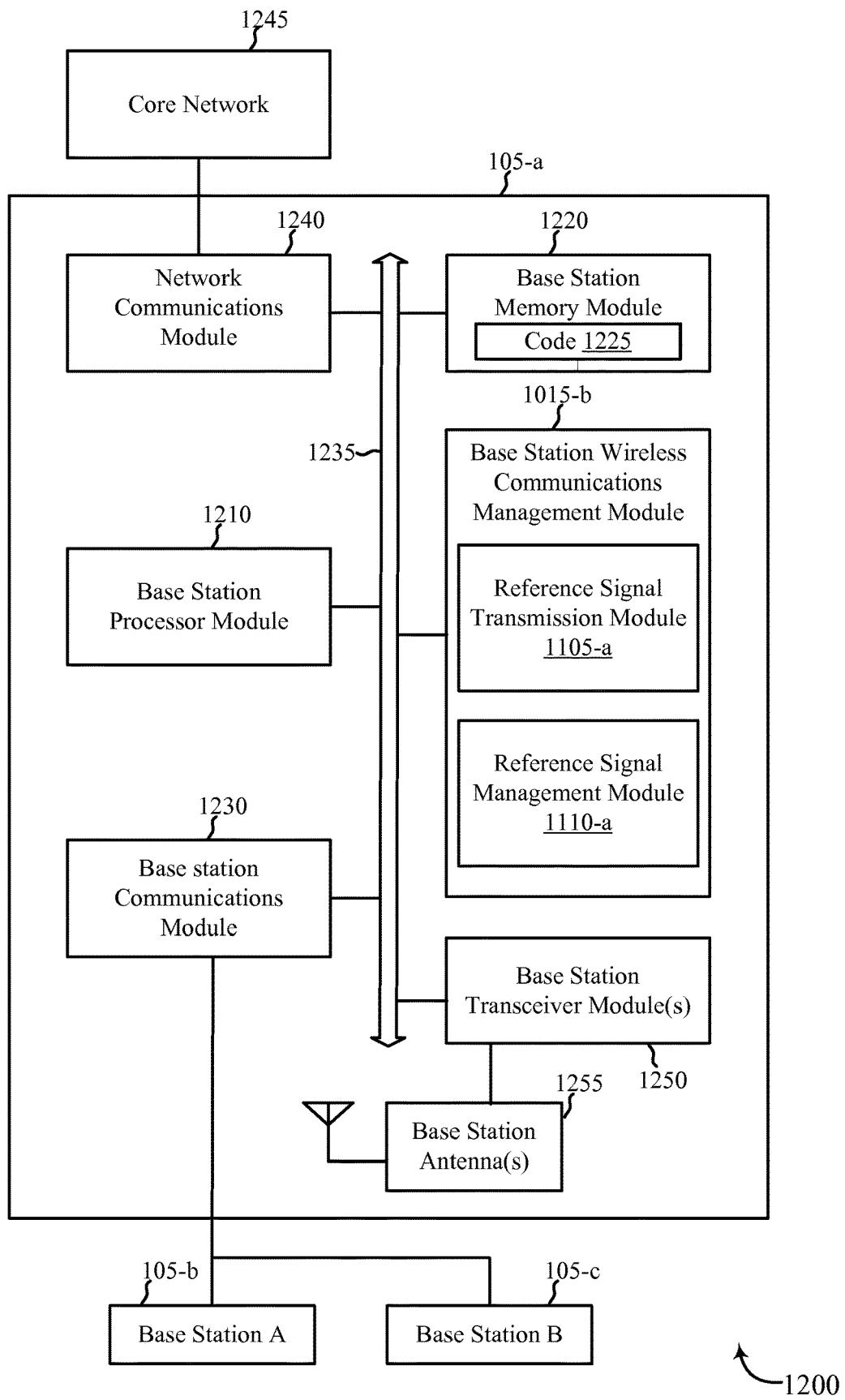
FIG. 12 shows a block diagram of a base station (e.g., a base station forming part or all of an eNB) for use in wireless communication, in accordance with various aspects of the present disclosure.

FIG. 12 shows a block diagram 1200 of a base station 105-*a* (e.g., a base station forming part or all of an eNB) for use in wireless communication, in accordance with various aspects of the present disclosure. In some examples, the base station 105-*a* may be an example of aspects of one or more of the base stations 105 described with reference to FIG. 1, and/or aspects of one or more of the apparatus 1005 when configured as a base station, as described with reference to FIG. 10 and/or 11. The base station 105-*a* may be configured to implement or facilitate at least some of the base station and/or apparatus features and functions described with reference to FIGS. 2-11.

The base station 105-*a* may include a base station processor module 1210, a base station memory module 1220, at least one base station transceiver module (represented by base station transceiver module(s) 1250), at least one base station antenna (represented by base station antenna(s) 1255), and/or a base station wireless communications management module 1015-*b*. The base station 105-*a* may also include one or more of a base station communications module 1230 and/or a network communications module 1240. Each of these modules may be in communication with each other, directly or indirectly, over one or more buses 1235.

The base station memory module 1220 may include random access memory (RAM) and/or read-only memory (ROM). The base station memory module 1220 may store computer-readable, computer-executable software/firmware code 1225 containing instructions that are configured to, when executed, cause the base station processor module 1210 to perform various functions described herein related to wireless communication (e.g., reference signal transmission and signaling related to combining reference signals, etc.). Alternatively, the computer-readable, computer-executable software/firmware code 1225 may not be directly executable by the base station processor module 1210 but be configured to cause the base station 105-*a* (e.g., when compiled and executed) to perform various of the functions described herein.

The base station processor module 1210 may include an intelligent hardware device, e.g., a central processing unit (CPU), a microcontroller, an ASIC, etc. The base station processor module 1210 may process information received through the base station transceiver module(s) 1250, the base station communications module 1230, and/or the network communications module 1240. The base station processor module 1210 may also process information to be sent to the transceiver module(s) 1250 for transmission through the antenna(s) 1255, to the base station communications module 1230, for transmission to one or more other base stations 105-*b* and 105-*c*, and/or to the network communications module 1240 for transmission to a core network 1245, which may be an example of one or more aspects of the core network 130 described with reference to FIG. 1. The base station processor module 1210 may handle, alone or in connection with the base station wireless communications management module 1015-*b*, various aspects of reference signal transmission and signaling such as discussed above with respect to FIGS. 2-6.

The base station transceiver module(s) 1250 may include a modem configured to modulate packets and provide the modulated packets to the base station antenna(s) 1255 for transmission, and to demodulate packets received from the base station antenna(s) 1255. The base station transceiver module(s) 1250 may, in some examples, be implemented as one or more base station transmitter modules and one or more separate base station receiver modules. The base station transceiver module(s) 1250 may support communications in a first radio frequency spectrum band and/or a second radio frequency spectrum band. The base station transceiver module(s) 1250 may be configured to communicate bi-directionally, via the antenna(s) 1255, with one or more UEs or apparatuses, such as one or more of the UEs 115 described with reference to FIG. 1. The base station 105-*a* may include, for example, multiple base station antennas 1255 (e.g., an antenna array). The base station 105-*a* may communicate with the core network 1245 through the network communications module 1240. The base station 105-*a* may also communicate with other base stations, such as the base stations 105-*b* and 105-*c*, using the base station communications module 1230.

The base station wireless communications management module 1015-*b* may be configured to perform and/or control some or all of the features and/or functions described with reference to FIGS. 2-6 related to reference signal generation and transmission, and signaling indicating that certain reference signals may be combined. The base station wireless communications management module 1015-*b* may include reference signal transmission module 1105-*a* and reference signal management module 1110-*a*, which may perform and/or control some or all of the features and/or functions described with reference to FIG. 2-6 or 11 related to reference signal generation and transmission, and signaling indicating that certain reference signals may be combined. The base station wireless communications management module 1015-*b*, or portions of the module 1015-*b*, may include a processor, and/or some or all of the functions of the base station wireless communications management module 1015-*b* may be performed by the base station processor module 1210 and/or in connection with the base station processor module 1210. In some examples, the base station wireless communications management module 1015-*b* may be an example of the base station wireless communications management module 1015 and/or 1015-*a* described with reference to FIG. 10 and/or 11.

Figure 13:
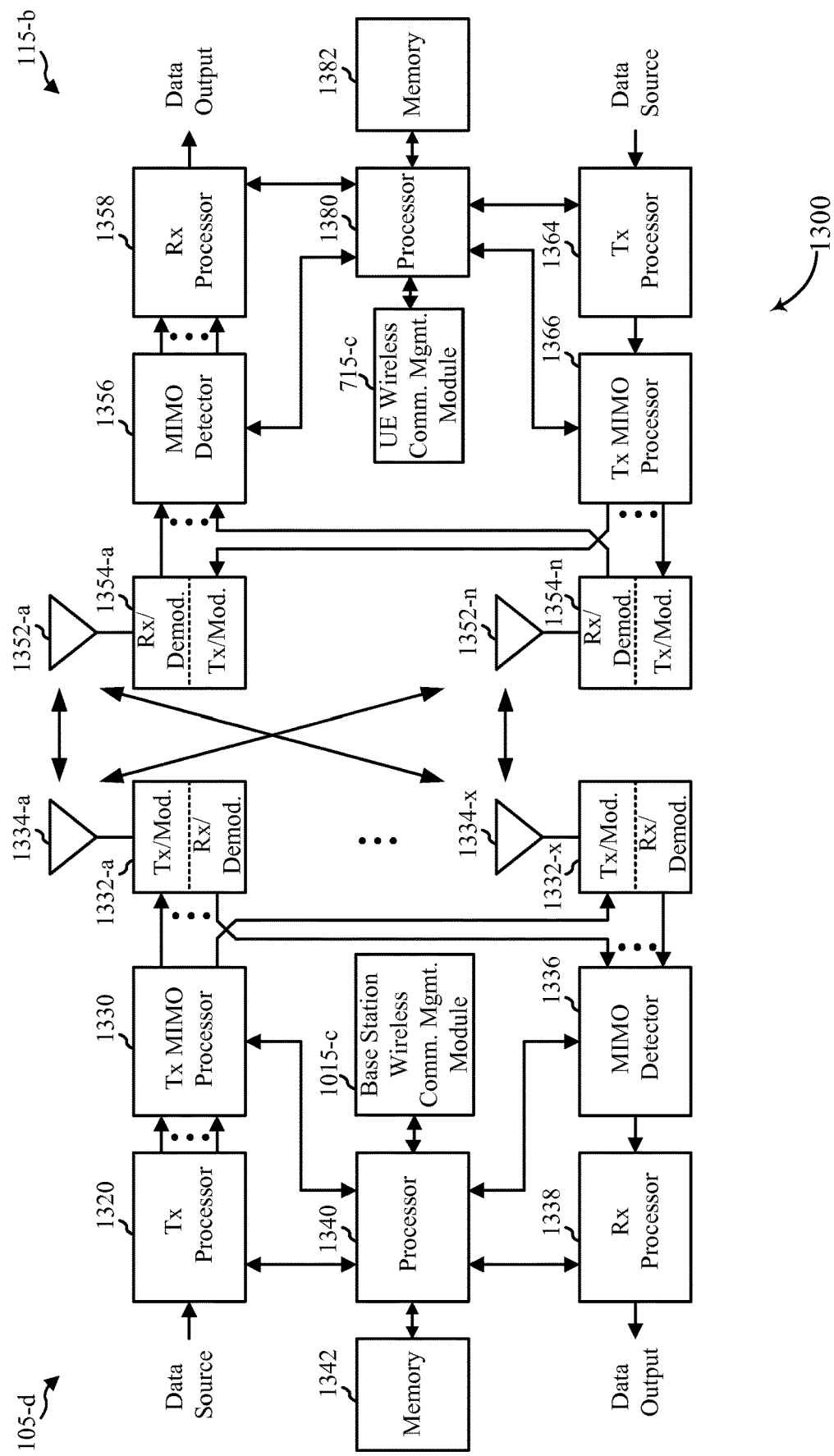
FIG. 13 shows a block diagram of a multiple-input/multiple-output communication system, in accordance with various aspects of the present disclosure.

FIG. 13 is a block diagram of a multiple input/multiple output (MIMO) communications system 1300 including a base station 105-*d* and a UE 115-*b*. The MIMO communications system 1300 may illustrate aspects of the wireless communications system 100 shown in FIG. 1. The base station 105-*d* may be equipped with antennas 1334-*a* through 1334-*x*, and the UE 115-*b* may be equipped with antennas 1352-*a* through 1352-*n*. In the MIMO communications system 1300, the base station 105-*d* may be able to send data over multiple communication links at the same time. Each communication link may be called a "layer" and the "rank" of the communication link may indicate the number of layers used for communication. For example, in a 2×2 MIMO communications system where base station 105-*d* transmits two "layers," the rank of the communication link between the base station 105-*d* and the UE 115-*b* is two.

At the base station 105-*d*, a transmit processor 1320 may receive data from a data source. The transmit processor 1320 may process the data. The transmit processor 1320 may also generate control symbols and/or reference symbols. A transmit (TX) MIMO processor 1330 may perform spatial processing (e.g., precoding) on data symbols, control symbols, and/or reference symbols, if applicable, and may provide output symbol streams to the transmit modulators/reception demodulators 1332-*a* through 1332-*x*. Each transmit modulator/reception demodulator 1332 may process a respective output symbol stream (e.g., for OFDM, etc.) to obtain an output sample stream. Each transmit modulator/reception demodulator 1332 may further process (e.g., convert to analog, amplify, filter, and upconvert) the output sample stream to obtain a DL signal. In one example, a DL signal from transmit modulators/reception demodulators 1332-*a* through 1332-*x* may be transmitted via one or more of the antennas 1334-*a* through 1334-*x*. Although transmit modulators/reception demodulators 1332-*a* through 1332-*x* are depicted as combined boxes in FIG. 13, the transmit modulator can be separately (either functionally, or physically) located from the reception demodulator.

At the UE 115-*b*, antennas 1352-*a* through 1352-*n* may receive the DL signals from the base station 105-*d* and may provide the received signals to the transmit modulators/reception demodulators 1354-*a* through 1354-*n*, respectively. Each transmit modulator/reception demodulator 1354 may condition (e.g., filter, amplify, downconvert, and digitize) a respective received signal to obtain input samples. Each transmit modulator/reception demodulator 1354 may further process the input samples (e.g., for OFDM, etc.) to obtain received symbols. A MIMO detector 1356 may obtain received symbols from all the transmit modulators/reception demodulators 1354-*a* through 1354-*n*, perform MIMO detection on the received symbols, if applicable, and provide detected symbols. A receive processor 1358 may process (e.g., demodulate, deinterleave, and decode) the detected symbols, providing decoded data for the UE 115-*b* to a data output, and provide decoded control information to a processor 1380, or memory 1382. Although transmit modulators/reception demodulators 1354-*a* through 1354-*n* are depicted as combined boxes in FIG. 13, the transmit modulator can be separately (either functionally, or physically) located from the reception demodulator. Still further, in an aspect, transmit modulators/reception demodulators 1354-*a* through 1354-*n* along with antennas 1352-*a* through 1352-*n* may be used to depict example structural support for receiver module 710 and transmitter module 720.

The processor 1380 may in some cases execute stored instructions to instantiate one or more of a UE wireless communications management module 715-*c*. The UE wireless communications management module 715-*c* may be an example of aspects of the wireless communications management module 715 described with reference to FIGS. 7, 8 and/or 9.

On the uplink (UL), at the UE 115-*b*, a transmit processor 1364 may receive and process data from a data source. The transmit processor 1364 may also generate reference symbols for a reference signal. The symbols from the transmit processor 1364 may be precoded by a transmit MIMO processor 1366 if applicable, further processed by the demodulators 1354-*a* through 1354-*n* (e.g., for SC-FDMA, etc.), and be transmitted to the base station 105-*d* in accordance with the transmission parameters received from the base station 105-*d*. At the base station 105-*d*, the UL signals from the UE 115-*b* may be received by the antennas 1334, processed by the transmit modulators/reception demodulators 1332, detected by a MIMO detector 1336 if applicable, and further processed by a receive processor 1338. The receive processor 1338 may provide decoded data to a data output and to the processor 1340 and/or memory 1342. The processor 1340 may in some cases execute stored instructions to instantiate one or more of a base station wireless communications management module 1015-*c*. The base station wireless communications management module 1015-*c* may be an example of aspects of the wireless communications management module 1015 described with reference to FIGS. 10, 11 and/or 12. Still further, in an aspect, transmit modulators/reception demodulators 1332-*a* through 1332-*x* along with antennas 1334-*a* through 1334-*x* may be used to depict example structural support for receiver module 1010 and transmitter module 1020.

The components of the UE 115-*b* may, individually or collectively, be implemented with one or more ASICs adapted to perform some or all of the applicable functions in hardware. Each of the noted modules may be a means for performing one or more functions related to operation of the MIMO communications system 1300. Similarly, the components of the base station 105-*d* may, individually or collectively, be implemented with one or more ASICs adapted to perform some or all of the applicable functions in hardware. Each of the noted components may be a means for performing one or more functions related to operation of the MIMO communications system 1300.

Figure 14:
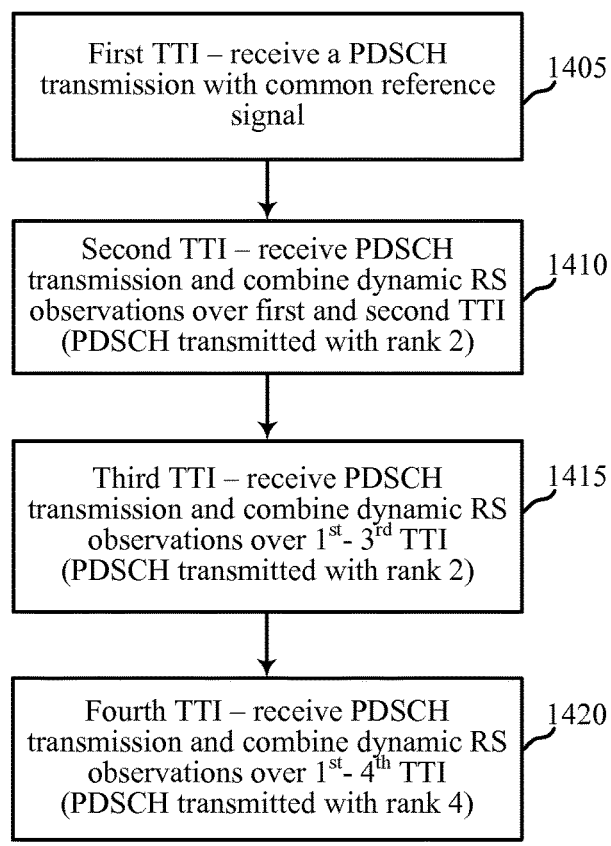
FIG. 14 is a flow chart illustrating an example of a method for wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to aspects of one or more of the UEs 115, described with reference to FIGS. 1, 9 and/or 13, and/or aspects of one or more of the devices described with reference to FIGS. 7 and/or 8. In some examples, a UE may execute one or more sets of codes to control the functional elements of the UE to perform the functions described below. Additionally or alternatively, the UE may perform one or more of the functions described below using special-purpose hardware. The method 1400 may provide an example for increasing the rank for communications with a base station based on combining of reference signals for channel estimation.

At block 1405, the method 1400 may include, for a first TTI, receiving a PDSCH transmission that is transmitted with a common reference signal. As discussed above, a common reference signal may be transmitted using established resources within a radio frame, and, in certain examples, may be transmitted with no precoding applied thereto. The operations of block 1405 may be performed by, for example, the receiver module 710 and/or the wireless communications management module 715 of FIGS. 7, 8, 9, and/or 13 and/or associated receivers/antennas.

At block 1410, the method 1400 may include, for a second TTI, receiving a PDSCH transmission and combining dynamic RS observations over the first and second TTIs. The PDSCH, in some examples, may be transmitted with rank 2 over two dynamic RS ports. The operations of block 1410 may be performed by, for example, the receiver module 710 and/or the wireless communications management module 715 of FIGS. 7, 8, 9, and/or 13 and/or associated receivers/antennas.

During a third TTI, as indicated at block 1415, the UE may receive a PDSCH transmission and combine dynamic RS observations over the first through third TTIs. The PDSCH, in some examples, may be transmitted with rank 2 over two dynamic RS ports. The operations of block 1410 may be performed by, for example, the receiver module 710 and/or the wireless communications management module 715 of FIGS. 7, 8, 9, and/or 13 and/or associated receivers/ antennas.

During a fourth TTI, as indicated at block 1420, the UE may receive a PDSCH transmission and combine dynamic RS observations over the first through fourth TTIs. The PDSCH, in some examples, may be transmitted with rank 4 over four dynamic RS ports. The operations of block 1410 may be performed by, for example, the receiver module 710 and/or the wireless communications management module 715 of FIGS. 7, 8, 9, and/or 13. The base station, in such examples, may ensure that precoding on dynamic RS ports for the UE remain unchanged over the corresponding TTIs.

Thus, the method 1400 may provide for wireless communication. It should be noted that the method 1400 is just one implementation and that the operations of the method 1400 may be rearranged or otherwise modified such that other implementations are possible. Further, as noted above, an example structural implementation of receiver module 710 may be transmit modulators/reception demodulators 1354-*a* through 1354-*n* along with antennas 1352-*a* through 1352-*n* of FIG. 13. The communications of method 1400 may be transmitted using portions of the wireless communications system 100 described with reference to FIG. 1 between one or more base stations 105 (e.g., eNBs) and one or more UEs 115, for example. Additionally, wireless resources within a system bandwidth may include a legacy control region and a low latency region as described with reference to FIGS. 3, 5, and 6. Such a configuration may be used with either FDM or TDM communications. The legacy control region may include, in certain examples, the first one or two symbols of each subframe, which may include various legacy control and signaling information. In some examples, the legacy control region may also include the center six resource blocks and CRS resource elements of certain subframes, such as discussed with respect to FIG. 2. As mentioned above, in certain examples reference signals, such as DM-RS, may be transmitted in symbols of multiple TTIs, and DM-RS may be transmitted using resources associated with a UE ID or a group ID.

Figure 15:
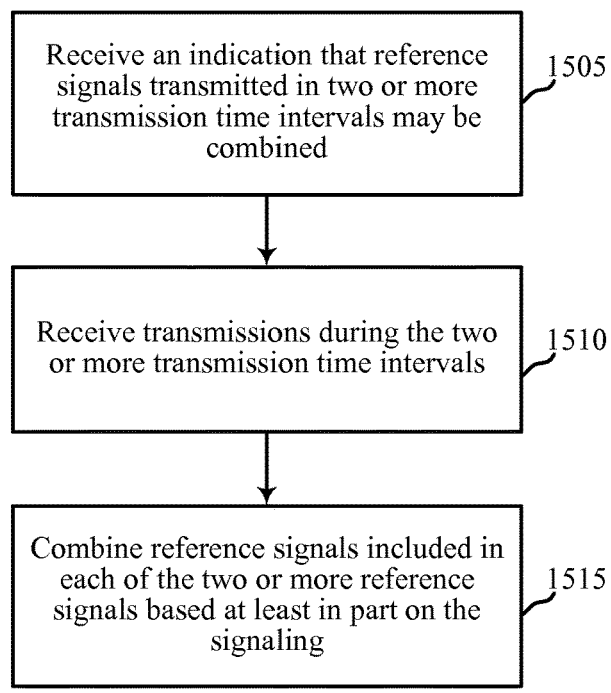
FIG. 15 is a flow chart illustrating an example of a method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the UEs 115, described with reference to FIGS. 1, 9 and/or 13, and/or aspects of one or more of the devices described with reference to FIGS. 7 and/or 8. In some examples, a UE may execute one or more sets of codes to control the functional elements of the UE to perform the functions described below. Additionally or alternatively, the UE may perform one or more of the functions described below using special-purpose hardware. The method 1500 may provide an example for increasing the rank for communications with a base station based on combining of reference signals for channel estimation.

At block 1505, the method 1500 may include receiving an indication that reference signals transmitted in two or more transmission time intervals are combinable. In some cases, the indication is received through explicit signaling. In some examples, the indication is received in one or more control signals. The operations of block 1505 may be performed by, for example, the receiver module 710 and/or the wireless communications management module 715 of FIGS. 7, 8, 9, and/or 13 and/or associated receivers/antennas.

At block 1510, the method 1500 may include receiving transmissions during the two or more transmission time intervals. In some cases, the two or more transmission time intervals each comprise a transmission time interval of a first type having a duration that is less than a duration of a transmission time interval of a second type. The operations of block 1510 may be performed by, for example, the receiver module 710 and/or the wireless communications management module 715 of FIGS. 7, 8, 9, and/or 13 and/or associated receivers/antennas.

At block 1515, the method 1500 may include combining the reference signals included in the transmissions during the two or more transmission time intervals based at least in part on the indication. In some cases, the reference signals are transmitted using resources associated with a group identification or a UE identification. In some examples, the presence of a reference signal is determined according to a scrambling sequence, where the group identification is associated with the scrambling sequence. The operations of block 1515 may be performed by, for example, the wireless communications management module 715 of FIGS. 7, 8, 9, and/or 13.

Thus, the method 1500 may provide for wireless communication. It should be noted that the method 1500 is just one implementation and that the operations of the method 1500 may be rearranged or otherwise modified such that other implementations are possible. Further, as noted above, an example structural implementation of receiver module 710 may be transmit modulators/reception demodulators 1354-*a* through 1354-*n* along with antennas 1352-*a* through 1352-*n* of FIG. 13. The communications of method 1500 may be transmitted using portions of the wireless communications system 100 described with reference to FIG. 1 between one or more base stations 105 (e.g., eNBs) and one or more UEs 115, for example. Additionally, wireless resources within a system bandwidth may include a legacy control region and a low latency region as described with reference to FIGS. 3, 5, and 6. Such a configuration may be used with either FDM or TDM communications. The legacy control region may include, in certain examples, the first one or two symbols of each subframe, which may include various legacy control and signaling information. In some examples, the legacy control region may also include the center six resource blocks and CRS resource elements of certain subframes, such as discussed with respect to FIG. 2. As mentioned above, in certain examples reference signals, such as DM-RS, may be transmitted in symbols of multiple TTIs, and DM-RS may be transmitted using resources associated with a UE ID or a group ID.

Figure 16:
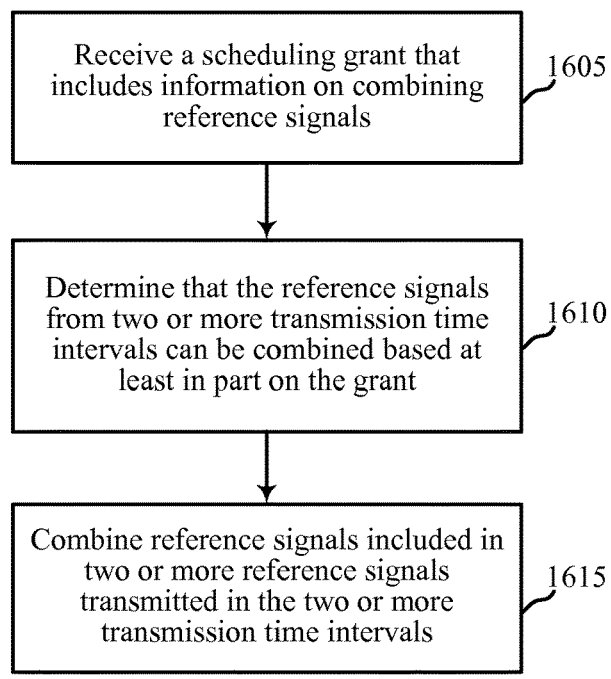
FIG. 16 is a flow chart illustrating another example of a method for wireless communication, in accordance with various aspects of the present disclosure.

FIG. 16 is a flow chart illustrating an example of a method 1600 for wireless communication, in accordance with various aspects of the present disclosure. For clarity, the method 1600 is described below with reference to aspects of one or more of the UEs 115, described with reference to FIGS. 1, 9 and/or 13, and/or aspects of one or more of the devices described with reference to FIGS. 7 and/or 8. In some examples, a UE may execute one or more sets of codes to control the functional elements of the UE to perform the functions described below. Additionally or alternatively, the UE may perform one or more of the functions described below using special-purpose hardware. The method 1600 may provide an example for increasing the rank for communications with a base station based on combining of reference signals for channel estimation.

At block 1605, the method 1600 may include receiving the indication through a scheduling grant that includes information on combining reference signals. In some cases, the indication is received through a control channel format used to transmit the scheduling grant. In some cases, combination of the reference signals is determined based at least in part on determining that the scheduling grant and at least one other transmission are transmitted within a set number of consecutive transmission time intervals. The operations of block 1605 may be performed by, for example, the receiver module 710 and/or the wireless communications management module 715 of FIGS. 7, 8, 9, and/or 13 and/or associated receivers/antennas.

At block 1610, the method 1600 may include determining that the reference signals from two or more transmission time intervals can be combined based at least in part on the grant. In some cases, the two or more transmission time intervals are consecutive transmission time intervals. In some examples, the two or more transmission time intervals are within a predetermined number of non-consecutive transmission time intervals. The operations of block 1610 may be performed by, for example, the receiver module 710 and/or the wireless communications management module 715 of FIGS. 7, 8, 9, and/or 13 and/or associated receivers/antennas.

At block 1615, the method 1600 may include combining reference signals included in two or more reference signals transmitted in the two or more transmission time intervals. In some cases, the reference signals are combined when the group identifications associated with the reference signals are the same in the two or more transmission time intervals. In some examples, reference signals are combined from a first transmission time interval and a second transmission time interval of the two or more transmission time intervals during the second transmission time interval. In other examples, reference signals are combined from the first transmission time interval, the second transmission time interval, and a third transmission time interval of the two or more transmission time intervals during the third transmission time interval. In some cases, physical downlink shared channel (PDSCH) transmissions use an initial low rank until the reference signals are combined over at least the first transmission time interval and the second transmission time interval, and PDSCH transmissions use a higher rank following the second transmission time interval. The operations of block 1615 may be performed by, for example, the receiver module 710 and/or the wireless communications management module 715 of FIGS. 7, 8, 9, and/or 13 and/or associated receivers/antennas.

Thus, the method 1600 may provide for wireless communication. It should be noted that the method 1600 is just one implementation and that the operations of the method 1600 may be rearranged or otherwise modified such that other implementations are possible. Further, as noted above, an example structural implementation of receiver module 710 may be transmit modulators/reception demodulators 1354-*a* through 1354-*n* along with antennas 1352-*a* through 1352-*n* of FIG. 13. The communications of method 1600 may be transmitted using portions of the wireless communications system 100 described with reference to FIG. 1 between one or more base stations 105 (e.g., eNBs) and one or more UEs 115, for example. Additionally, wireless resources within a system bandwidth may include a legacy control region and a low latency region as described with reference to FIGS. 3, 5, and 6. Such a configuration may be used with either FDM or TDM communications. The legacy control region may include, in certain examples, the first one or two symbols of each subframe, which may include various legacy control and signaling information. In some examples, the legacy control region may also include the center six resource blocks and CRS resource elements of certain subframes, such as discussed with respect to FIG. 2. As mentioned above, in certain examples reference signals, such as DM-RS, may be transmitted in symbols of multiple TTIs, and DM-RS may be transmitted using resources associated with a UE ID or a group ID.

Figure 17:
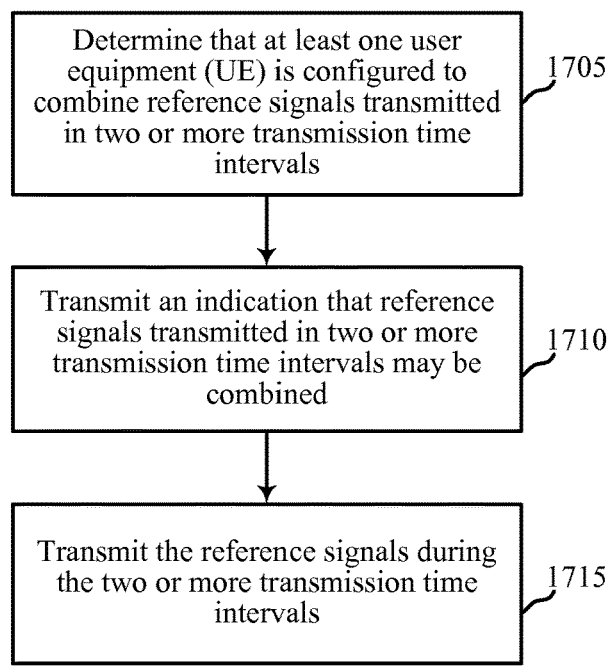
FIG. 17 is a flow chart illustrating another example of a method for wireless communication, in accordance with various aspects of the present disclosure.

FIG. 17 is a flow chart illustrating an example of a method 1700 for wireless communication, in accordance with various aspects of the present disclosure. For clarity, the method 1700 is described below with reference to aspects of one or more of the base stations 105, described with reference to FIGS. 1, 12, and/or 13, and/or aspects of one or more of the devices described with reference to FIG. 10 and/or 11. In some examples, a base station may execute one or more sets of codes to control the functional elements of the base station to perform the functions described below. Additionally or alternatively, the base station may perform one or more of the functions described below using special-purpose hardware.

At block 1705, the method 1700 may include determining that at least one user equipment (UE) is configured to combine reference signals transmitted in two or more transmission time intervals. The operations of block 1705 may be performed by the wireless communications management module 1015 of FIGS. 10, 11, 12, and/or 13.

At block 1710, the method may include transmitting an indication that reference signals transmitted in two or more transmission time intervals may be combined. The operation(s) at block 1710 may be performed by, for example, the transmitter module 1020 and/or the wireless communications management module 1015 of FIGS. 10, 11, 12, and/or 13 and/or the associated receivers/antennas.

At block 1715, the method may include transmitting the reference signals during the two or more transmission time intervals. The operation(s) at block 1715 may be performed by, for example, transmitter module 1020 and/or the wireless communications management module 1015 of FIGS. 10, 11, 12, and/or 13 and/or the associated receivers/antennas.

Thus, the method 1700 may provide for wireless communication. It should be noted that the method 1700 is just one implementation and that the operations of the method 1700 may be rearranged or otherwise modified such that other implementations are possible. Further, as noted above, an example structural implementation of transmitter module 1020 may be transmit modulators/reception demodulators 1332-*a* through 1332-*x* along with antennas 1334-*a* through 1334-*x* of FIG. 13. The communications of method 1700 may be transmitted using portions of the wireless communications system 100 described with reference to FIG. 1 between one or more base stations 105 (e.g., eNBs) and one or more UEs 115, for example. Additionally, wireless resources within a system bandwidth may include a legacy control region and a low latency region as described with reference to FIGS. 3, 5, and 6. Such a configuration may be used with either FDM or TDM communications. The legacy control region may include, in certain examples, the first one or two symbols of each subframe, which may include various legacy control and signaling information. In some examples, the legacy control region may also include the center six resource blocks and CRS resource elements of certain subframes, such as discussed with respect to FIG. 2. As mentioned above, in certain examples reference signals, such as DM-RS, may be transmitted in symbols of multiple TTIs, and DM-RS may be transmitted using resources associated with a UE ID or a group ID.

In some examples, aspects from two or more of the methods 1400 through 1700 may be combined. It should be noted that the methods 1400, 1500, 1600, and 1700 are just example implementations, and that the operations of the methods 1400-1700 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   receiving, at a user equipment (UE), a downlink grant for two or more transmission time intervals, wherein the downlink grant indicates that reference signals transmitted in the two or more transmission time intervals are combinable with each other, wherein the reference signals are transmitted using resources associated with a group identification or a UE identification;
   receiving, at the UE, a first transmission during a first transmission time interval and a second transmission during a second transmission time interval, wherein the second transmission time interval follows the first transmission time interval;
   determining that a first reference signal received during the first transmission time interval and a second reference signal received during the second transmission time interval can be combined based at least in part on the downlink grant;
   combining, at the UE, the first reference signal from the first transmission time interval and the second reference signal from the second transmission time interval included in the transmissions in accordance with the determining; and
   decoding, based at least in part on the combination of the first reference signal and the second reference signal, data from the first transmission time interval, data from the second transmission time interval, or a combination thereof.

2. The method of claim 1, wherein the indication is received through explicit signaling.

3. The method of claim 1, wherein the indication is received in one or more control signals.

4. The method of claim 1, wherein the two or more transmission time intervals are consecutive transmission time intervals.

5. The method of claim 1, wherein the two or more transmission time intervals are within a predetermined number of non-consecutive transmission time intervals.

6. The method of claim 1, wherein the indication is received through a scheduling grant.

7. The method of claim 6, wherein the indication is received through a control channel format used to transmit the scheduling grant.

8. The method of claim 6, wherein the combination of the reference signals is determined based at least in part on determining that the scheduling grant and at least one other transmission are transmitted within a set number of consecutive transmission time intervals.

9. The method of claim 1, further comprising:
   determining a presence of a reference signal according to a scrambling sequence, wherein the group identification is associated with the scrambling sequence.

10. The method of claim 1, wherein the reference signals are combined when the group identification associated with the reference signals are the same in the two or more transmission time intervals.

11. The method of claim 1, wherein the combining comprises:
    combining the first reference signal from the first transmission time interval and the second reference signal from the second transmission time interval of the two or more transmission time intervals during the second transmission time interval; and combining reference signals from the first transmission time interval, the second transmission time interval, and a third transmission time interval of the two or more transmission time intervals during the third transmission time interval.

12. The method of claim 11, wherein physical downlink shared channel (PDSCH) transmissions use an initial low rank until the reference signals are combined over at least the first transmission time interval and the second transmission time interval, and PDSCH transmissions use a higher rank following the second transmission time interval.

13. The method of claim 1, wherein the two or more transmission time intervals each comprise a transmission time interval of a first type having a duration that is less than a duration of a transmission time interval of a second type.

14. An apparatus for wireless communication, comprising:
means for receiving, at the apparatus, a downlink grant for two or more transmission time intervals, wherein the downlink grant indicates that reference signals transmitted in the two or more transmission time intervals are combinable with each other, wherein the reference signals are transmitted using resources associated with a group identification or a user equipment (UE) identification;
means for receiving, at the apparatus, a first transmission during a first transmission time interval and a second transmission during a second transmission time interval, wherein the second transmission time interval follows the first transmission time interval;
means for determining that a first reference signal received during the first transmission time interval and a second reference signal received during the second transmission time interval can be combined based at least in part on the downlink grant;
means for combining, at the apparatus, the first reference signal from the first transmission time interval and the second reference signal from the second transmission time interval included in the transmissions in accordance with the determining; and
means for decoding, based at least in part on the combination of the first reference signal and the second reference signal, data from the first transmission time interval, data from the second transmission time interval, or a combination thereof.

15. An apparatus for wireless communication, comprising:
a processor;
memory coupled with the processor; and
instructions stored in the memory, the instructions being executable by the processor to:
receive, at the apparatus, a downlink grant for two or more transmission time intervals, wherein the downlink grant indicates that reference signals transmitted in the two or more transmission time intervals are combinable with each other, wherein the reference signals are transmitted using resources associated with a group identification or a user equipment (UE) identification, wherein the second transmission time interval follows the first transmission time interval;
receive, at the apparatus, a first transmission during a first transmission time interval and a second transmission during a second transmission time interval;
determine that a first reference signal received during the first transmission time interval and a second reference signal received during the second transmission time interval can be combined based at least in part on the downlink grant;
combine, at the apparatus, the first reference signal from the first transmission time interval and the second reference signal from the second transmission time interval included in the transmissions in accordance with the determining; and
decode, based at least in part on the combination of the first reference signal and the second reference signal, data from the first transmission time interval, data from the second transmission time interval, or a combination thereof.

16. The apparatus of claim 15, wherein the instructions are further executable by the processor to:
receive the indication through explicit signaling.

17. The apparatus of claim 15, wherein the indication is received in one or more control signals.

18. The apparatus of claim 15, wherein the two or more transmission time intervals are consecutive transmission time intervals.

19. The apparatus of claim 15, wherein the two or more transmission time intervals are within a predetermined number of non-consecutive transmission time intervals.

20. The apparatus of claim 15, wherein the indication is received through a scheduling grant.

21. The apparatus of claim 20, wherein the indication is received through a control channel format used to transmit the scheduling grant.

22. The apparatus of claim 20, wherein the combination of the reference signals is determined based at least in part on determining that the scheduling grant and at least one other transmission are transmitted within a set number of consecutive transmission time intervals.

23. The apparatus of claim 15, wherein the group identification is associated with a scrambling sequence, and wherein the instructions are further executable by the processor to:
determine a presence of a reference signal according to the scrambling sequence.

24. The apparatus of claim 15, wherein the instructions are further executable by the processor to:
combine the reference signals when the group identification associated with the reference signals are the same in the two or more transmission time intervals.

25. The apparatus of claim 15, wherein the instructions are further executable by the processor to:
combine the first reference signal from the first transmission time interval and the second reference signal from the second transmission time interval of the two or more transmission time intervals during the second transmission time interval; and
combine the reference signals from the first transmission time interval, the second transmission time interval, and a third transmission time interval of the two or more transmission time intervals during the third transmission time interval.

26. The apparatus of claim 25, wherein physical downlink shared channel (PDSCH) transmissions use an initial low rank until the reference signals are combined over at least the first transmission time interval and the second transmission time interval, and PDSCH transmissions use a higher rank following the second transmission time interval.

27. The apparatus of claim 15, wherein the two or more transmission time intervals each comprise a transmission time interval of a first type having a duration that is less than a duration of a transmission time interval of a second type.

28. A non-transitory computer-readable medium storing a computer-executable code for wireless communication, the code executable by a processor to:
- receive, at an apparatus, a downlink grant for two or more transmission time intervals, wherein the downlink grant indicates that reference signals transmitted in the two or more transmission time intervals are combinable with each other, wherein the reference signals are transmitted within resources associated with a group identification or a user equipment (UE) identification;
- receive, at the apparatus, a first transmission during a first transmission time interval and a second transmission during a second transmission time interval, wherein the second transmission time interval follows the first transmission time interval;
- determine that a first reference signal received during the first transmission time interval and a second reference signal received during the second transmission time interval can be combined based at least in part on the downlink grant;
- combine, at the apparatus, the first reference signal from the first transmission time interval and the second reference signal from the second transmission time interval included in the transmissions in accordance with the determining; and
- decode, based at least in part on the combination of the first reference signal and the second reference signal, data from the first transmission time interval, data from the second transmission time interval, or a combination thereof.

* * * * *